United States Patent
Takeuchi et al.

(10) Patent No.: US 9,649,908 B2
(45) Date of Patent: May 16, 2017

(54) TEMPERATURE REGULATION DEVICE

(71) Applicant: DENSO CORPORATION, Kariya, Aichi-pref. (JP)

(72) Inventors: Masayuki Takeuchi, Nukata-gun (JP); Seiji Inoue, Nukata-gun (JP); Takashi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 439 days.

(21) Appl. No.: 14/382,968

(22) PCT Filed: Feb. 18, 2013

(86) PCT No.: PCT/JP2013/000867
§ 371 (c)(1),
(2) Date: Sep. 4, 2014

(87) PCT Pub. No.: WO2013/132756
PCT Pub. Date: Sep. 12, 2013

(65) Prior Publication Data
US 2015/0017492 A1    Jan. 15, 2015

(30) Foreign Application Priority Data

Mar. 7, 2012 (JP) .................. 2012-050833
Dec. 19, 2012 (JP) .................. 2012-277333

(51) Int. Cl.
*H01M 10/50* (2006.01)
*H01M 2/12* (2006.01)
(Continued)

(52) U.S. Cl.
CPC ..... *B60H 1/00278* (2013.01); *B60H 1/00385* (2013.01); *B60H 1/3211* (2013.01);
(Continued)

(58) Field of Classification Search
CPC .. H01M 10/60; H01M 10/617; H01M 10/625; H01M 2/1083
See application file for complete search history.

(56) References Cited

U.S. PATENT DOCUMENTS

| | | | |
|---|---|---|---|
| 6,023,935 A | 2/2000 | Okazaki et al. | |
| 7,013,659 B2 * | 3/2006 | Yoshida | B60H 1/00278 429/62 |

FOREIGN PATENT DOCUMENTS

| | | |
|---|---|---|
| JP | S60255522 A | 12/1985 |
| JP | H0840088 A | 2/1996 |

(Continued)

OTHER PUBLICATIONS

International Search Report and Written Opinion (in Japanese with English Translation) for PCT/JP2013/000867, mailed May 21, 2013; ISA/JP.

*Primary Examiner* — Patrick Ryan
*Assistant Examiner* — Julian Anthony
(74) *Attorney, Agent, or Firm* — Harness, Dickey & Pierce, P.L.C.

(57) ABSTRACT

A heat pump cycle includes a refrigerant circuit and a coolant circuit. A first heat exchanger and a second heat exchanger are disposed between the refrigerant circuit and the coolant circuit. The first heat exchanger includes an exterior heat exchanger that functions as an evaporator in a heating operation, and a radiator for radiating heat of a coolant. The second heat exchanger transmits a heat of high-pressure refrigerant to the coolant in the heating operation. A temperature of refrigerant within the second heat exchanger is higher than a temperature of refrigerant within the first heat exchanger. The heat obtained from the second heat exchanger is supplied to the first heat exchanger through the coolant. Further, the heat obtained from the second heat exchanger is stored in the coolant. In defrosting (Continued)

operation, the coolant that has stored the heat therein is supplied to the first heat exchanger.

7 Claims, 17 Drawing Sheets

(51) Int. Cl.
    *B60H 1/00*     (2006.01)
    *B60L 11/18*     (2006.01)
    *B60H 1/32*     (2006.01)
    *B60L 1/00*     (2006.01)
    *B60L 1/02*     (2006.01)
    *H01M 10/625*     (2014.01)
    *H01M 10/6563*     (2014.01)

(52) U.S. Cl.
    CPC ................ *B60L 1/003* (2013.01); *B60L 1/02* (2013.01); *B60L 11/1874* (2013.01); *B60L 11/1875* (2013.01); *B60L 11/1879* (2013.01); *H01M 10/625* (2015.04); *H01M 10/6563* (2015.04); *B60L 2240/28* (2013.01); *B60L 2240/34* (2013.01); *B60L 2270/46* (2013.01); *Y02T 10/7005* (2013.01); *Y02T 10/705* (2013.01)

(56) References Cited

FOREIGN PATENT DOCUMENTS

| | | |
|---|---|---|
| JP | H10244827 A | 9/1998 |
| JP | 2000314565 A | 11/2000 |
| JP | 2002313441 A | 10/2002 |
| JP | 2005273998 A | 10/2005 |
| JP | 2008062875 A | 3/2008 |
| JP | 2010277767 A | 12/2010 |

* cited by examiner

HIGH-PERFORMANCE COOLING MODE

LOW-PERFORMANCE COOLING MODE

HEATING MODE

LOW-PERFORMANCE COOLING MODE

COOLING MODE

HEATING MODE

FIG. 12    INTERIOR COOLING AND INTERNAL AIR MODE

FIG. 13  INTERIOR COOLING AND EXTERNAL AIR MODE

INTERIOR HEATING AND INTERNAL AIR MODE

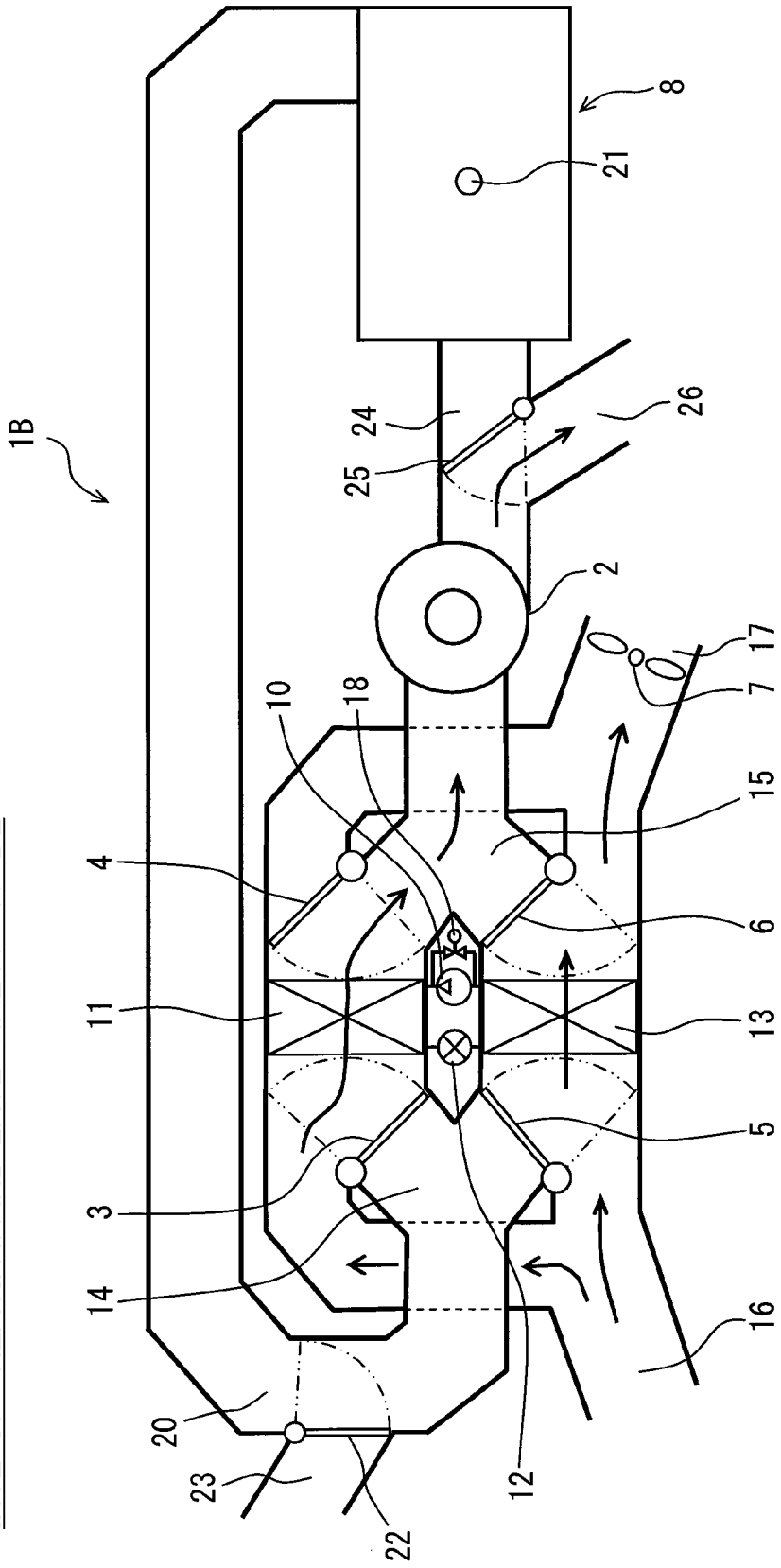

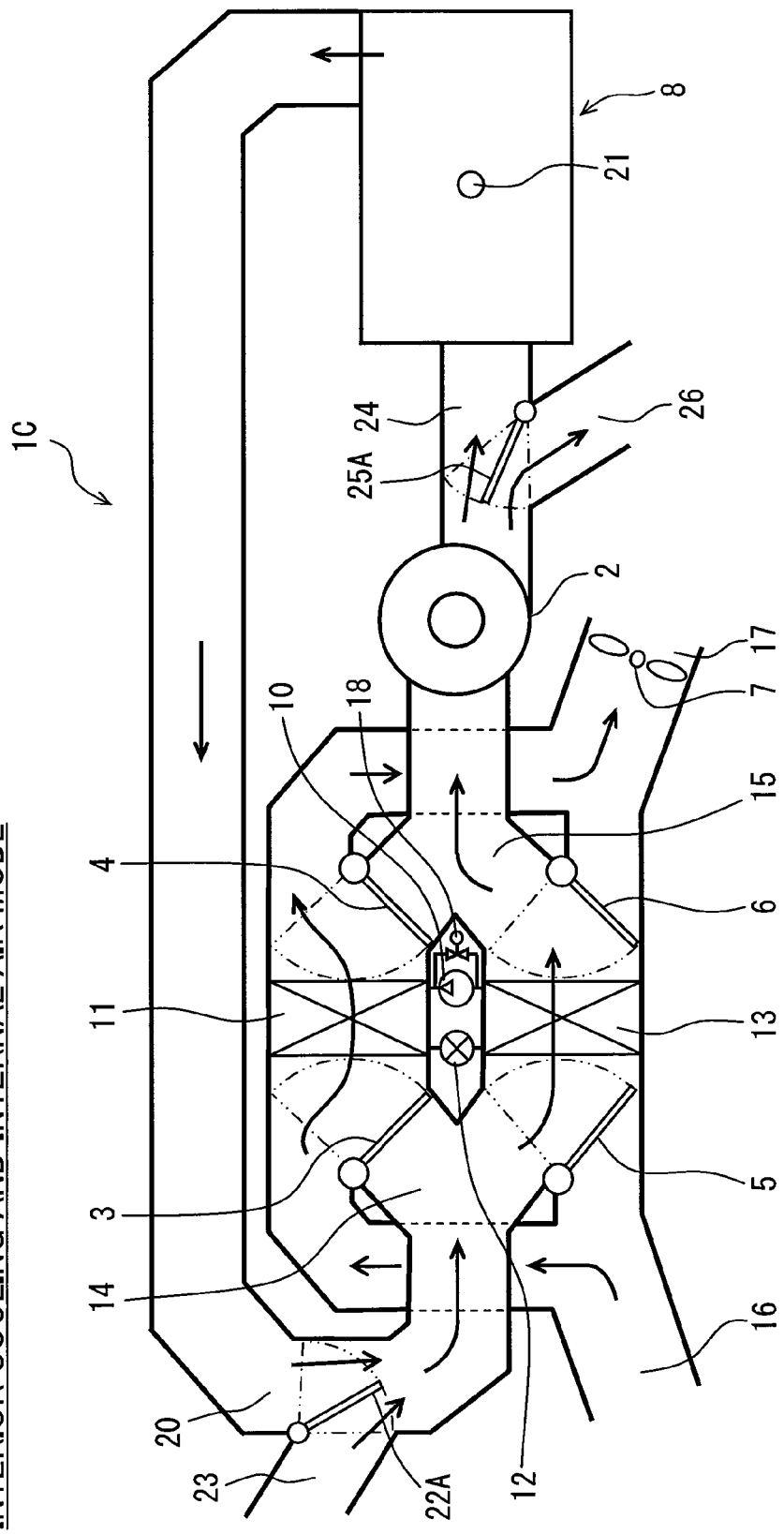

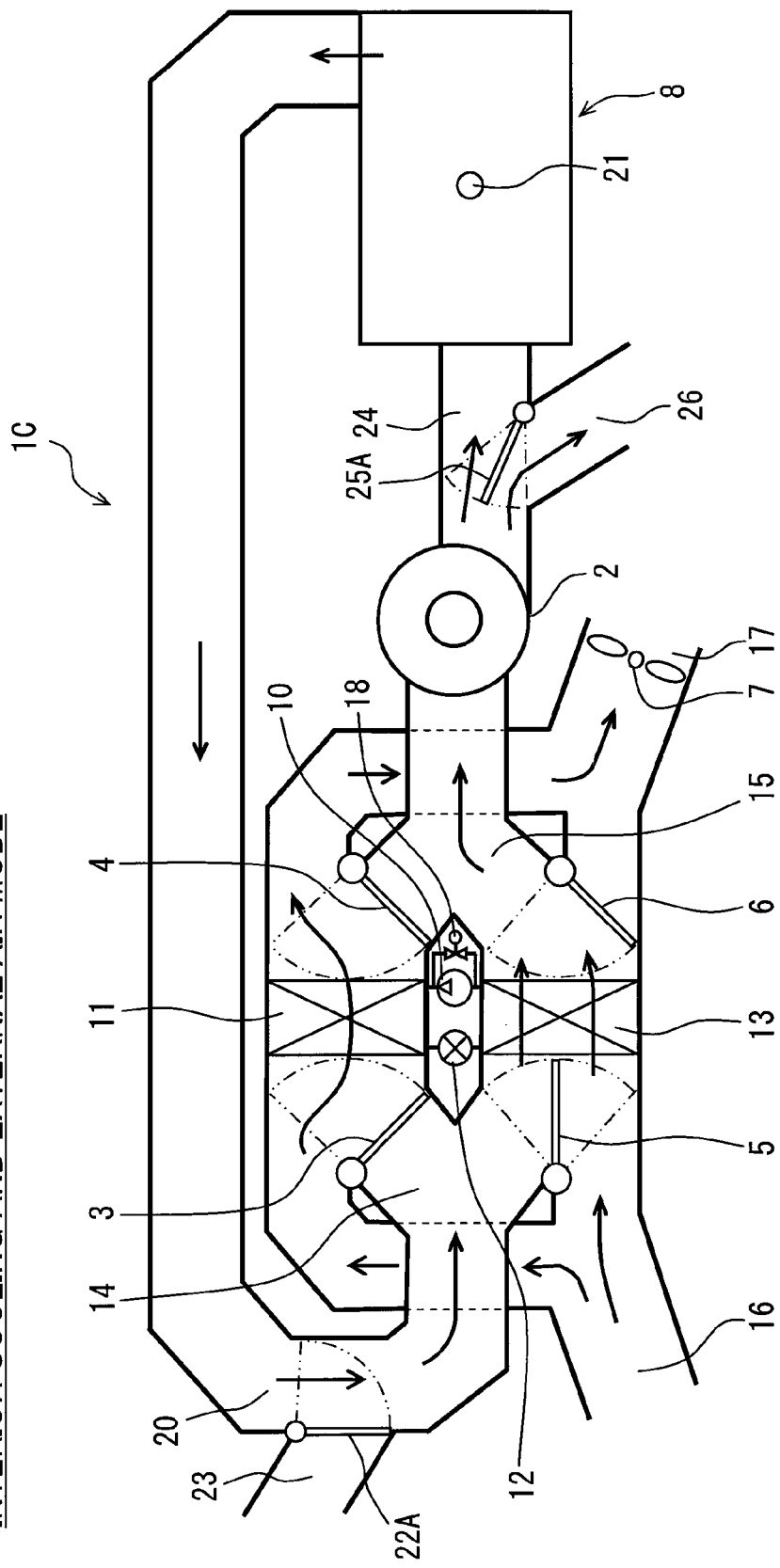
FIG. 17  INTERIOR COOLING AND EXTERNAL AIR MODE

TEMPERATURE REGULATION DEVICE

CROSS REFERENCE TO RELATED APPLICATIONS

This application is a U.S. National Phase Application under 35 U.S.C. 371of International Application No. PCT/JP2013/000867 filed on Feb. 18, 2013 and published in Japanese as WO 2013/132756 A1 on Sep. 12, 2013. This application is based on and claims the benefit of priority from Japanese Patent Applications No. 2012-050833 filed on Mar. 7, 2012, and No. 2012-277333 filed on Dec. 19, 2012. The entire disclosures of all of the above applications are incorporated herein by reference.

TECHNICAL FIELD

The present disclosure relates to a temperature regulation device that regulates a temperature of a temperature-regulation target in a vehicle by sending air.

BACKGROUND ART

Temperature-regulation targets that require temperature regulation include but are not limited to a secondary battery storing electric power to run an electric automobile, a hybrid automobile, and the like, electric devices generating heat while in use, and air conditioning of a vehicle interior space. These temperature-regulation targets have an appropriate temperature range to exert furnished functions and an appropriate temperature range to maintain comfort and therefore require a temperature regulation device capable of regulating a temperature within the appropriate temperature range as needed.

Such a temperature regulation device is described in Patent Document 1. The temperature regulation device of Patent Document 1 has an evaporator cooled by a refrigerant supplied from a refrigeration cycle of an air-conditioning device and provided to an air passage in which a vehicle battery is installed, and cools the battery by letting air circulate in the air passage using an air sending device.

Patent Document 2 describes a temperature regulation device using a heat pipe. The temperature regulation device of Patent Document 2 includes a heat pipe heat-absorbing portion provided in close proximity to a side portion of a case storing a battery to absorb heat by flowing a refrigerant internally, a heat pipe heat-releasing portion provided to the outside of an vehicle interior and releasing heat by flowing the refrigerant internally, and a connection portion connecting the heat pipe heat-absorbing portion and the heat pipe heat-releasing portion to let the refrigerant circulate. The heat pipe heat-absorbing portion, the heat pipe heat-releasing portion, and the connection portion together form a heat pipe in which the refrigerant circulates by condensation and evaporation of the refrigerant.

Patent Document 3 describes a temperature regulation device provided with an air-conditioning refrigeration cycle capable of not only heating but also cooling a vehicle interior space. The temperature regulation device of Patent Document 3 switches flows of air by controlling opening and closing positions of multiple dampers and can therefore introduce air heated in a high-pressure side heat exchanger into the vehicle interior space during heating and introducing air cooled in a low-pressure side heat exchanger into the vehicle interior space during cooling.

According to the technique of Patent Document 1, the evaporator to cool the battery is included but no device to heat the battery is included. Hence, the battery cannot be heated and a separate heating device may be required in order not only to heat but also to cool the battery.

According to the technique of Patent Document 2, the battery is cooled by the heat absorbing action of the heat pipe method. Hence, this technique can cool the battery in a case where the battery generates a small amount of heat and required battery cooling performance is several hundred watts or less on such occasions as when the vehicle is parked or traveling in the city. However, this technique may possibly fail to cool the battery sufficiently in a case where the battery generates a large amount of heat and required battery cooling performance is approximately several kilo watts on such occasions as when the vehicle is traveling at a high speed or climbing a hill. In addition, the technique of Patent Document 2 can only cool the battery. Hence, in order not only to heat but also to cool the battery, a separate heating device may be required.

The technique of Patent Document 3 relates to a device used for the air conditioning of the vehicle interior space. When this technique is applied to battery temperature regulation, it becomes necessary to drive a compressor even when required battery cooling performance is low (under low load) on such occasions as when the vehicle is parked or travelling in the city, and noises to the environment may possibly raise a problem. Also, in the device of Patent Document 3, a flow rate of the refrigerant is low under low load and an oil returning state to the compressor may possibly be deteriorated.

PRIOR ART DOCUMENT

Patent Document

Patent Document 1: JP 2002-313441 A
Patent Document 2: JP 2008-62875 A
Patent Document 3: JP 10-244827 A

SUMMARY OF THE INVENTION

The present disclosure was devised in view of the problems discussed above and has an object to provide a temperature regulation device capable of not only heating but also cooling a temperature-regulation target and achieving a power-saving and low-noise operation when required cooling performance is low.

According to a first aspect of the present disclosure, a temperature regulation device includes at least one temperature-regulation target to which air regulated in temperature is sent, the temperature-regulation target being provided to a vehicle, an air sending device sending the temperature-regulated air to the temperature-regulation target, a path switching device changing an air path, through which the temperature-regulated air flows, according to an operation mode, a heating heat exchanger heating air to be sent to the temperature-regulation target in a heating mode to heat the temperature-regulation target by a heat releasing action of a refrigerant flowing in a refrigeration cycle, a cooling heat exchanger cooling air to be sent to the temperature-regulation target in a cooling mode to cool the temperature-regulation target by a heat absorbing action of the refrigerant flowing in the refrigeration cycle, and a compressor discharging the refrigerant to the heating heat exchanger in the refrigeration cycle. The cooling heat exchanger is located at a lower position than the heating heat exchanger.

In this case, the configuration adopted for a positional relation of the cooling heat exchanger and the heating heat exchanger included in the refrigeration cycle is such that the heating heat exchanger is located above the cooling heat exchanger. Even in a case where the compressor is not driven, that is, in a case where the refrigerant is not forcibly discharged, the heating heat exchanger and the cooling heat exchanger can be functioned as a heat pipe that allows evaporation and condensation to repetitively take place. Hence, in a circumstance where cooling performance so high as to drive the compressor is not required, the cooling mode with the compressor in a stopped state can be performed. Accordingly, noises to the environment can be reduced and power consumption can be saved. Hence, a temperature regulation device capable of not only heating but also cooling a temperature-regulation target and achieving a power-saving and low-noise operation when required cooling performance is low can be obtained.

According to a second aspect of the present disclosure, the temperature regulation device may include the refrigeration cycle that includes: a bypass passage that connects the cooling heat exchanger and the heating heat exchanger with bypassing the compressor; and a valve device that enables or disables flowing of the refrigerant in the bypass passage.

According to a third aspect of the present disclosure, the heating heat exchanger may have an outlet port that communicates with the cooling heat exchanger and is located in a lower part of the heating heat exchanger.

According to a fourth aspect of the present disclosure, the temperature regulation device may further include a temperature detector detecting a temperature of the temperature-regulation target, and a controller controlling the path switching device, the air sending device, and the compressor when each of the heating mode and the cooling mode is performed. The controller may perform the cooling mode at high performance by controlling the path switching device and the air sending device while driving the compressor when the temperature of the temperature-regulation target detected by the temperature detector exceeds a first predetermined temperature. The controller may perform the heating mode by controlling the path switching device and the air sending device while driving the compressor when the temperature of the temperature-regulation target detected by the temperature detector is below a second predetermined temperature that is lower than the first predetermined temperature. The controller may perform the cooling mode at low performance by controlling the path switching device and the air sending device so as to send air from which heat is absorbed in the cooling heat exchanger to the temperature-regulation target while controlling the compressor not to be driven but to be in a stopped state when the temperature of the temperature-regulated device detected by the temperature detector falls in a predetermined temperature range from the second predetermined temperature to the first predetermined temperature, both inclusive.

According to a fifth aspect of the present disclosure, the temperature-regulation target may include multiple temperature-regulation targets. The temperature regulation device may further include a setting device setting at least one of the multiple temperature-regulation targets to a sending destination of the temperature-regulated air.

According to a sixth aspect of the present disclosure, the multiple temperature-regulation targets may include a vehicle interior space and an in-vehicle device. When the in-vehicle device does not require temperature regulation and a request of temperature regulation of the vehicle interior space is received from a vehicle air-conditioning device mounted on the vehicle, the setting device may set the vehicle interior space to the sending destination of the temperature-regulated air.

According to a seventh aspect of the present disclosure, the multiple temperature-regulation targets may include a vehicle interior space and an in-vehicle device. When the in-vehicle device requires temperature regulation and a request of temperature regulation of the vehicle interior space is received from a vehicle air-conditioning device mounted on the vehicle, the setting device may set both the vehicle interior space and the in-vehicle device to the sending destinations of the temperature-regulated air.

According to an eighth aspect of the present disclosure, the temperature-regulation target may be a secondary battery that stores electric power to run the vehicle.

BRIEF DESCRIPTION OF THE DRAWINGS

FIG. 15 is a schematic diagram showing an operation state of the temperature regulation device in an interior heating and external air mode in the fourth embodiment.

FIG. 16 is a schematic diagram showing an operation state of the temperature regulation device in an interior cooling and internal air mode in the temperature regulation device according to the fifth embodiment of the present disclosure.

FIG. 17 is a schematic diagram showing an operation state of the temperature regulation device in an interior cooling and external air mode in the fifth embodiment.

EMBODIMENTS FOR EXPLOITATION OF THE INVENTION

Figure 1:
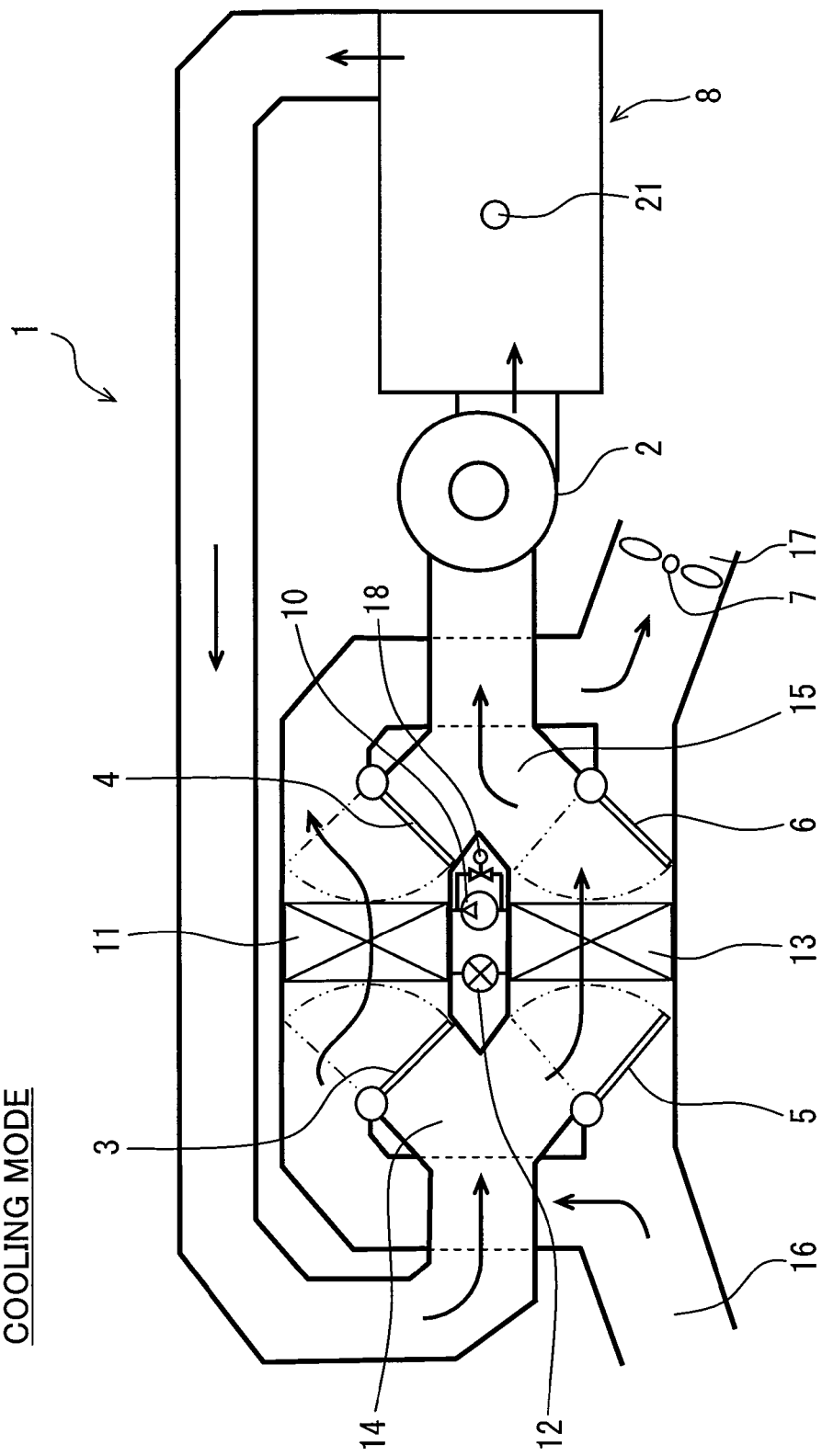
FIG. 1 is a schematic diagram showing an operation state of a temperature regulation device in a cooling mode according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A temperature regulation device of the present disclosure is used, for example, in an automobile using an internal combustion engine as a traveling drive source, a hybrid automobile using a combination of an internal combustion engine and a motor driven by electric power charged to a secondary battery as a travelling drive source, and an electric automobile using a motor as a traveling drive source. Temperature-regulation targets subject to temperature regulation are provided to a vehicle and include a space and a device to which, a temperature-regulated air regulated in temperature can be sent.

A first embodiment as one embodiment of the present disclosure will be described using FIG. 1 through FIG. 6. In FIG. 1, arrows indicate flows of air when a mode to cool a temperature-regulation target requiring temperature regulation is performed. In the first embodiment, air is adopted as a temperature regulating fluid used to regulate a temperature of an assembled battery 8 as an example of the temperature-regulation target.

Secondary batteries forming the assembled battery 8 can be charged and discharged and used to supply electric power to a vehicle travelling motor or the like. The electric power is stored in respective electric cells forming the assembled battery 8. The respective electric cells can be, for example, nickel-hydrogen secondary batteries, lithium-ion secondary batteries, or organic radical batteries. The assembled battery 8 is, for example, stored in an enclosure and installed under an automobile seat, in a space between a rear seat and a trunk room, in a space between a driver seat and a passenger seat, or the like.

A temperature regulation device 1 includes the assembled battery 8 formed of multiple electric cells connected so as to conduct a current, a blower 2 sending temperature-regulated air (hereinafter, referred to as the temperature-regulated air) to the multiple electric cells, a radiator 11 and an evaporator 13 regulating a temperature of air, doors 3, 4, 5, and 6 switching air passages, through which the temperature-regulated air flows, according to an operation mode, and a controller 9 controlling operations of the respective portions.

The assembled battery 8 is also an example of an electric device as the temperature-regulation target mounted on the vehicle and subject to temperature regulation. The assembled battery 8 is provided with a battery passage to let air flow so as to come into contact with outer surfaces or electrode terminals of the respective electric cells. A temperature of the assembled battery 8 can be regulated by letting the temperature-regulated air flow through this battery passage. The blower 2 may also be used as an example of an air sending device that sends the temperature-regulated air to the multiple electric cells.

The assembled battery 8 is controlled by electronic parts (not shown) used to charge and discharge the multiple electric cells and to regulate temperatures thereof, and the temperatures of the respective electric cells are regulated with air flowing the periphery. The electronic parts include a relay, an electronic part controlling an inverter of a charger, a battery monitoring device, a battery protection circuit, and various control devices. Each electric cell has an exterior case shaped, for example, like a flat rectangular prism and the electrode terminal protrudes from the exterior case. The electrode terminal protrudes outward from an end face parallel to a thickness direction and having a small area and is formed of a positive-electrode terminal and a negative-electrode terminal provided to each electric cell with a predetermined interval in between. All of the electric cells forming the assembled battery 8 are connected in series so that a current can be conducted from the negative-electrode terminal of the electric cell positioned at one end in a lamination direction to the positive-electrode terminal of the electric cell positioned at the other end in the lamination direction with bus bars connecting the electrode terminal of one electric cell and the electrode terminal of another adjacent electric cell.

A refrigeration cycle 100 is a refrigerant circuit formed by connecting at least a compressor 10, the radiator 11, a decompressor 12, and the evaporator 13 in an annular shape. The radiator 11 is a component included in the refrigeration cycle 100 and represents an example of a heating heat exchanger that generates the temperature-regulated air by heating air to be sent to the assembled battery 8. The radiator 11 is a heat exchanger that heats air passing through a heat exchanging portion 11a during a heating mode by the refrigerant compressed in the compressor 10 in the refrigeration cycle 100 through the action of releasing heat to the passing air.

The heat exchanging portion 11a includes tubes and outer fins provided alternately, and is formed by laminating the tubes and the outer fins integrally. The refrigerant flows inside the tubes and air to be heated passes by the outer fins present between adjacent tubes in a direction orthogonal to a refrigerant flowing direction. The multiple tubes are connected to an upper tank 11b at one ends and to a lower tank 11c at the other ends. The upper tank 11b and the lower tank 11c communicate with each other via interiors of the multiple tubes. In other words, the refrigerant flowing into the lower tank 11c may possibly flow into the upper tank 11b via the interiors of the tubes.

The evaporator 13 is a component included in the refrigeration cycle 100 and represents an example of a cooling heat exchanger that generates the temperature-regulated air by cooling air to be sent to the assembled battery 8. The evaporator 13 is a heat exchanger that cools air passing through a heat exchanging portion 13a by the refrigerant flowing out from the radiator 11 and decompressed in the decompressor 12 in the refrigeration cycle 100 through the action of absorbing heat from the passing air.

The heat exchanging portion 13a includes tubes and outer fins provided alternately, and is formed by laminating the tubes and the outer fins integrally. The refrigerant flows inside the tubes and air to be cooled passes by the outer fins present between adjacent tubes in a direction orthogonal to the refrigerant flowing direction. The multiple tubes are connected to an upper tank 13b at one ends and to a lower tank 13c at the other ends. The upper tank 13b and the lower tank 13c communicate with each other via the interiors of the multiple tubes. In other words, the refrigerant flowing into the lower tank 13c may possibly flow into the upper tank 13b via the interiors of the tubes.

Figure 2:
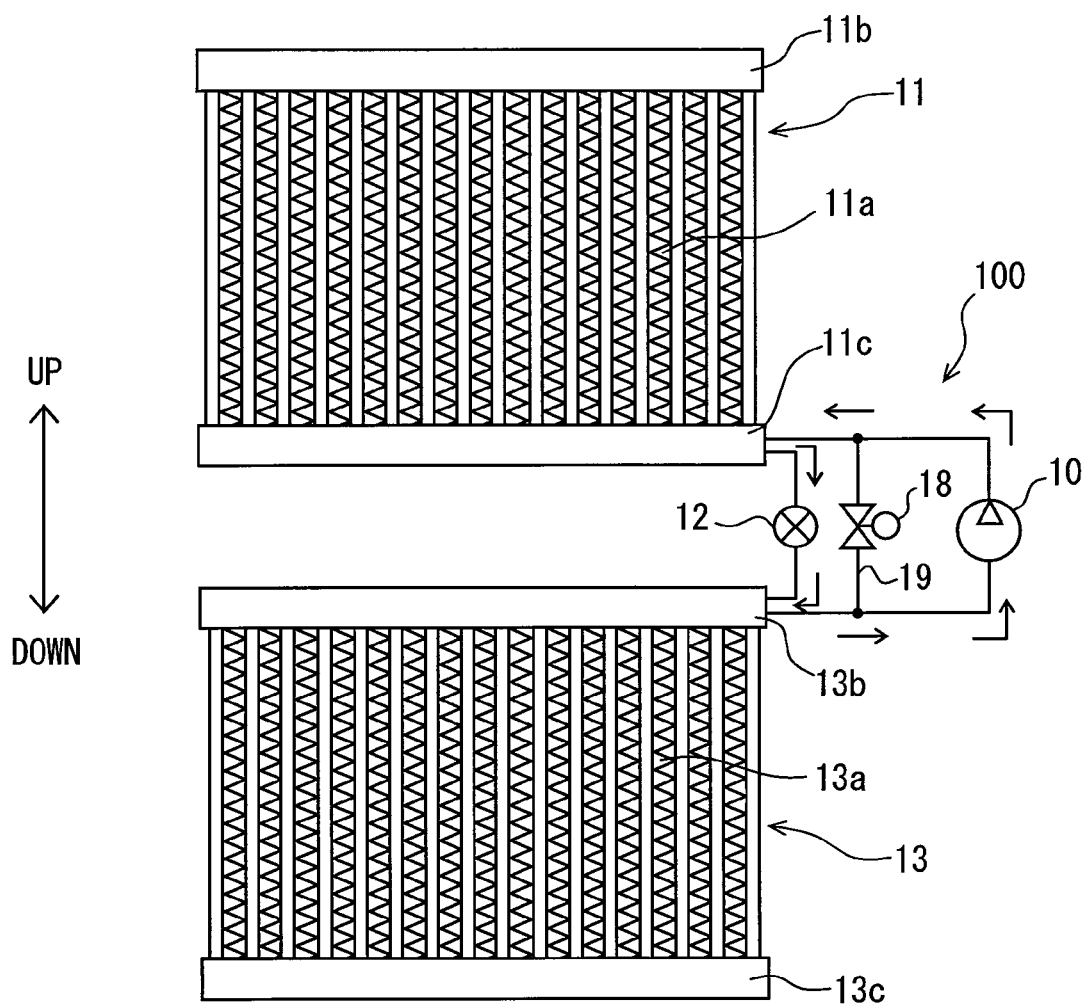
FIG. 2 is a schematic diagram showing an operation state of a refrigeration cycle in a high-performance cooling mode in the temperature regulation device of the first embodiment.

As is shown in FIG. 2, the evaporator 13 is located at a lower position than the radiator 11 in a direction of gravitational force. That is, when installed to the vehicle, the radiator 11 is present at a higher position than the evaporator 13. Further, an outlet port of the radiator 11 from which the refrigerant flows out toward the evaporator 13 is provided to the lower tank 11c and connected to the decompressor 12 via a refrigerant pipe. For the radiator 11 and the evaporator 13 to exert a heat pipe function, it is preferable to locate the outlet port of the radiator 11 in a lower part of the radiator 11. Also, the decompressor 12 is connected to the upper tank 13b of the evaporator 13 via a refrigerant pipe.

The refrigeration cycle 100 has a bypass passage 19 that connects the evaporator 13 and the radiator 11 by bypassing the compressor 10 and a solenoid valve 18 representing an example of a valve device that enables and disables a flow of the refrigerant in the bypass passage 19. The solenoid valve 18 is controlled by the controller 9 to be in an open state or a closed state according to an operation mode, and thereby enables or disables a flow of the refrigerant in the bypass passage 19.

It should be appreciated that a portion of the radiator 11 connected to a discharge portion of the compressor 10 is not limited to the lower tank 11c and a height position may be set arbitrarily. For example, this portion of the radiator 11 may be provided to the upper tank 11b.

Also, a portion of the evaporator 13 connected to a suction portion of the compressor 10 is not limited to the upper tank 13b and a height position may be set arbitrarily. For example, this portion of the evaporator 13 may be provided to the lower tank 13c.

In addition, a portion of the evaporator 13 connected to the outlet port of the decompressor 12 is not limited to the upper tank 13b and a height position may be set arbitrarily. For example, this portion of the evaporator 13 may be provided to the lower tank 13c.

Heat exchangers of the same configuration, that is, identical components may be used for the radiator 11 and the evaporator 13. Hence, heat exchangers used as the radiator 11 and the evaporators 13 are managed with a single component and man-hours for component management are reduced, which can contribute to a reduction of the product cost.

The temperature regulation device 1 includes, as air passages, the battery passage of the assembled battery 8, an upstream passage 14, a downstream passage 15, a first intake passage 16 (external air intake passage) communicating with the outside of the vehicle interior, and an exhaust passage 17 communicating with the outside of the vehicle interior. These air passages are formed inside a duct. An electric fan 7 is installed at a position at which a forced flow of external air from the first intake passage 16 to the exhaust passage 17 can be created. The blower 2 is installed between a downstream side of an air flow in the downstream passage 15 and an upstream side of an air flow in the battery passage and creates an air flow from the downstream passage 15 to the battery passage.

The assembled battery 8 is provided with a battery temperature sensor 21 that detects temperatures of the electric cells. The battery temperature sensor 21 is an example of a device temperature detector that detects a temperature of the temperature-regulation target. Also, the battery temperature sensor 21 can be formed so as to detect a surface temperature, a temperature of the electrode terminal, or a temperature of the bus bar of a predetermined electric cell.

The upstream passage 14 is a passage located upstream of the radiator 11 and the evaporator 13 in an air flow and branches to two passages that allow the upstream passage 14 to communicate with respective inlet ports of the radiator 11 and the evaporator 13. The downstream passage 15 is a passage located downstream of the radiator 11 and the evaporator 13 in an air flow and two passages extending from respective outlet ports of the radiator 11 and the evaporator 13 merge into the downstream passage 15. The first intake passage 16 is a passage located upstream of the radiator 11 and the evaporator 13 in an air flow. The exhaust passage 17 is a passage located downstream of the radiator 11 and the evaporator 13 in an air flow.

Figure 5:
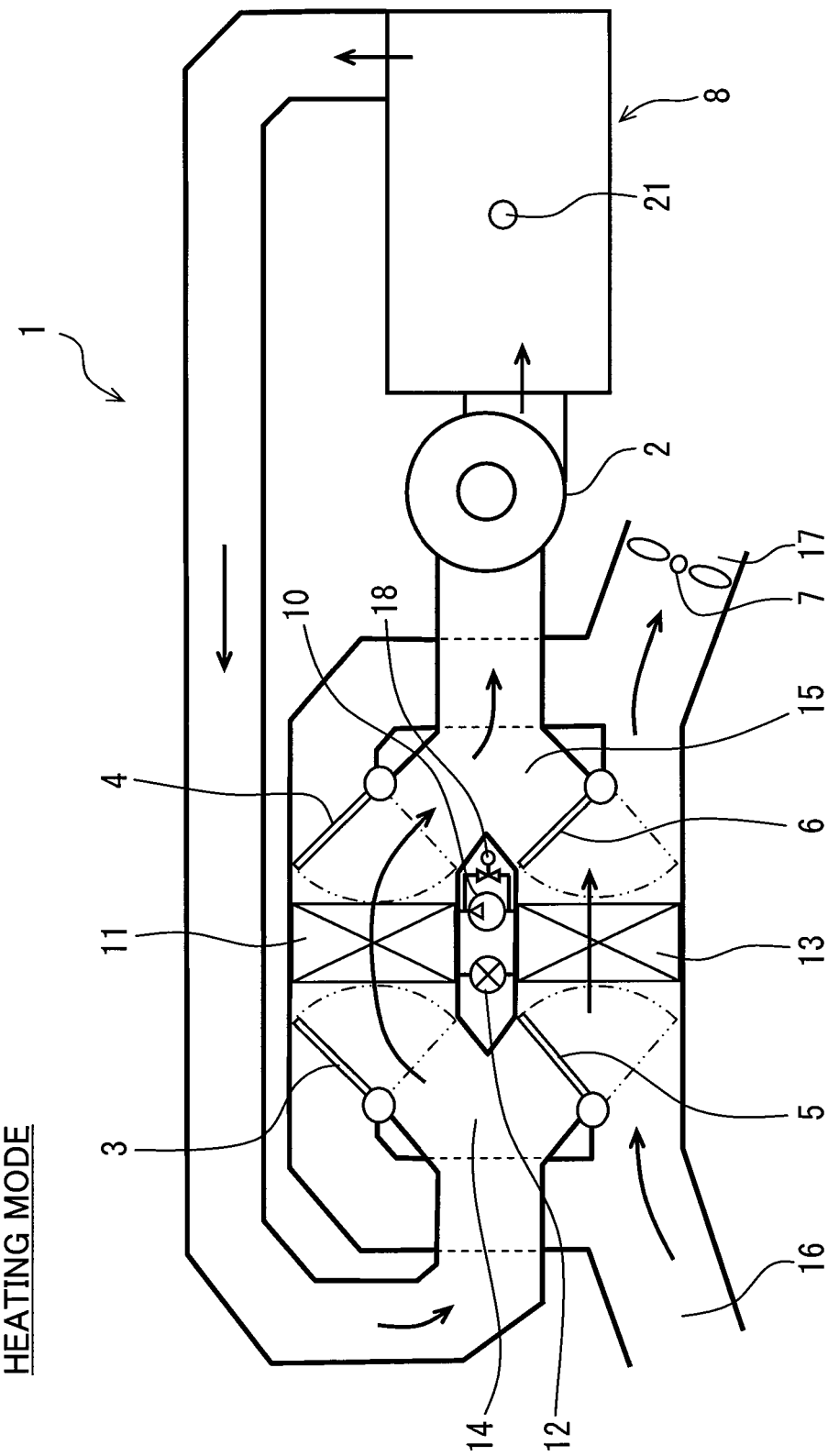
FIG. 5 is a schematic diagram showing an operation state of the temperature regulation device in a heating mode in the first embodiment.
Figure 6:
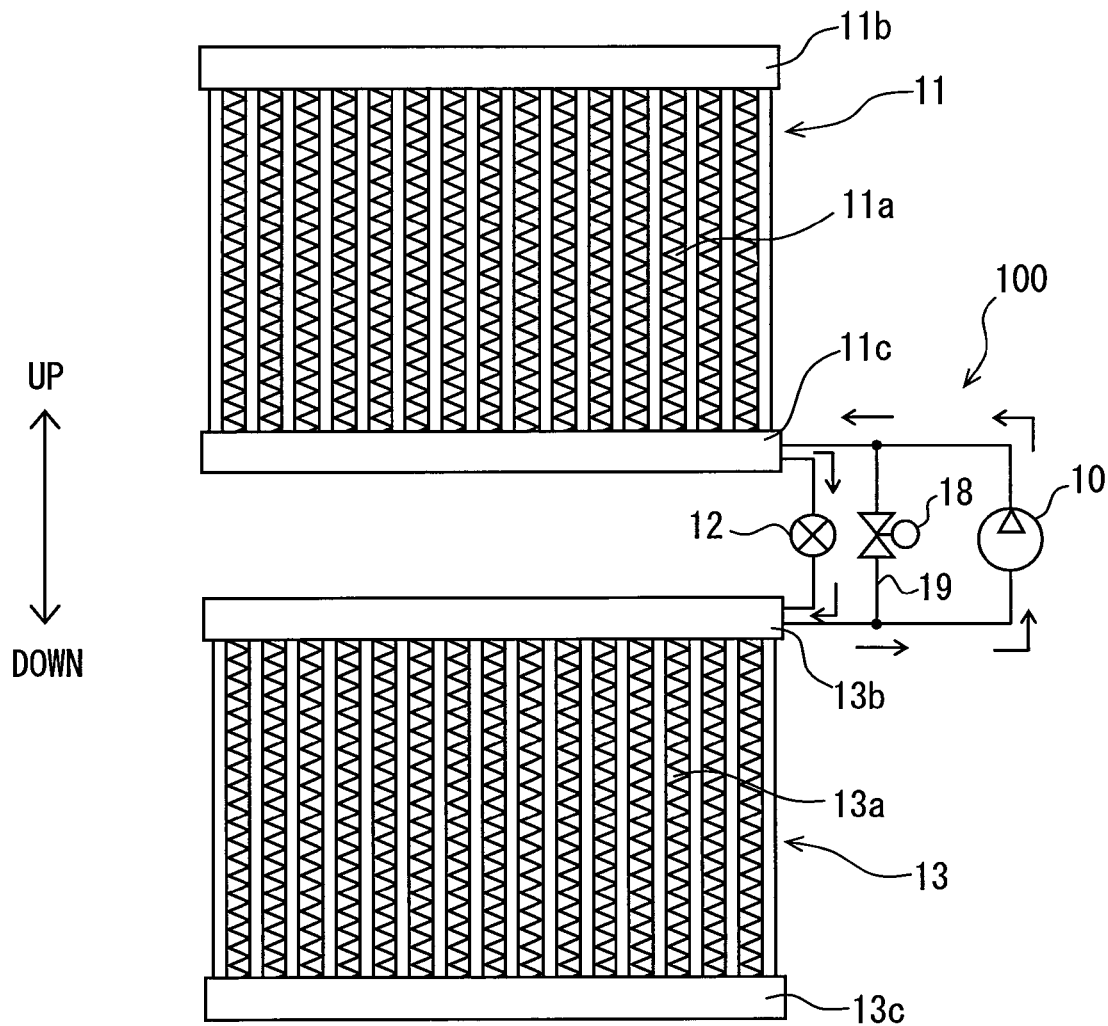
FIG. 6 is a schematic diagram showing an operation state of the refrigeration cycle in the heating mode in the temperature regulation device of the first embodiment.

The doors 3 through 6 may be used as examples of a path switching device that switches air paths, through which the temperature-regulated air flows, according to an operation mode. The door 3 is located downstream of the upstream passage 14 and upstream of the radiator 11 and represents an example of the path switching device set at an opening position to switch the air paths so that the inlet port of the radiator 11 communicates with either the upstream passage 14 or the first intake passage 16. The door 4 is located downstream of the radiator 11 and upstream of the downstream passage 15 and represents an example of the path switching device set at an opening position to switch the air paths so that the outlet port of the radiator 11 communicates with either the downstream passage 15 or the exhaust passage 17. During a heating operation to heat up the assembled battery 8, the opening positions of the door 3 and the door 4 are set as shown in FIG. 5 so as to form an air path to let the temperature-regulated air circulate between an air passage passing through the heat exchanging portion 11a of the radiator 11 and the battery passage of the assembled battery 8.

The door 5 is located downstream of the upstream passage 14 and upstream of the evaporator 13 and represents an example of the path switching device set at a position to switch the air paths so that the inlet port of the evaporator 13 communicates with either the upstream passage 14 or the first intake passage 16. The door 6 is located downstream of the evaporator 13 and upstream of the downstream passage 15 and represents an example of the path switching device set at a position to switch the air paths so that the outlet port of the evaporator 13 communicates with either the downstream passage 15 or the exhaust passage 17. During a cooling operation to cool the assembled battery 8, the opening positions of the door 5 and the door 6 are set as is shown in FIG. 1 so as to form an air path to let the temperature-regulated air circulate between an air passage passing through the heat exchanging portion 13a of the evaporator 13 and the battery passage of the assembled battery 8.

Figure 3:
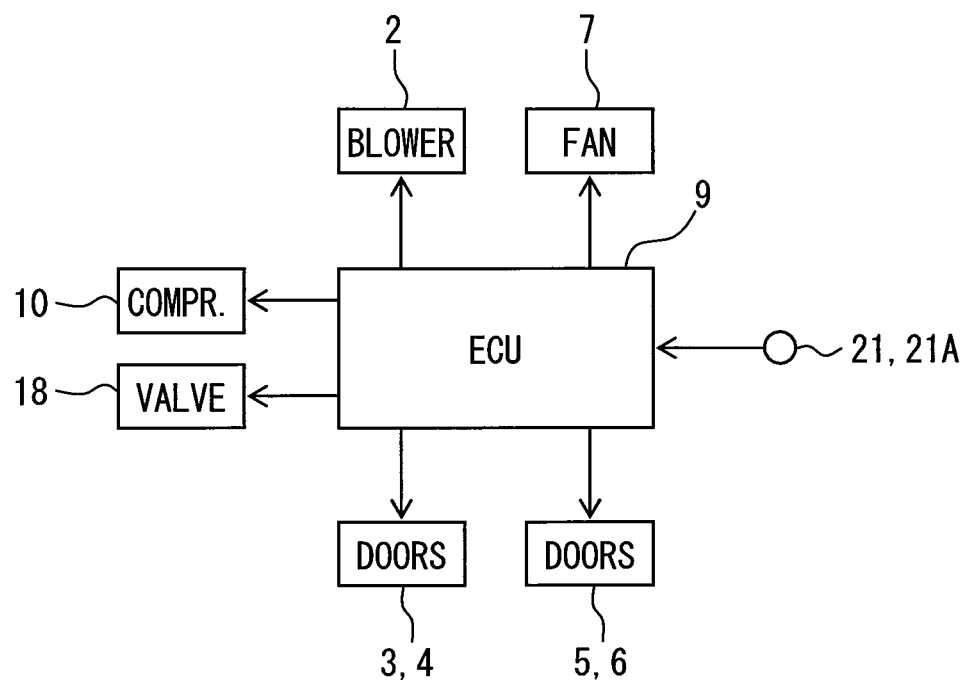
FIG. 3 is a block diagram showing a control configuration with respect to temperature regulation devices of the first embodiment and a third embodiment.

As is shown in FIG. 3, upon input of a detection signal of the battery temperature sensor 21, the controller 9 controls operations, such as a rotation number of the compressor 10, the opening and closing states of the solenoid valve 18, the opening positions of the respective doors 3 through 6, the rotation number of the blower 2, and the rotation number of the electric fan 7, according to a computation result using a computation program pre-stored in an computation portion, a memory device, or the like. The decompressor 12 is an opening-fixed decompressor. However, an amount of decompression may be controlled by the controller 9 using an opening-variable electronically-controlled expansion valve.

The controller 9 performs an operation in the heating mode by controlling the doors 3 through 6, the blower 2, the compressor 10, and the solenoid valve 18 when a performance condition of a heating operation to heat up the assembled battery 8 with a supply of hot air is established under the battery temperature regulation control. Also, when a performance condition of a cooling operation to cool air to be provided to the assembled battery 8 is established, the controller 9 performs an operation in the cooling mode by controlling the doors 3 through 6, the blower 2, the compressor 10, and the solenoid valve 18. The battery temperature regulation control is continued while a vehicle start switch (for example, an ignition switch) stays ON. Also, the cooling operation has two operation modes: a high-performance cooling mode and a low-performance cooling mode.

The high-performance cooling mode is a mode to exert high cooling performance and performed when the detected battery temperature exceeds a first predetermined temperature T1. The first predetermined temperature T1 can be, for example, 35° C. More specifically, when the controller 9 determines that the detected battery temperature exceeds 35° C., the controller 9 performs the high-performance cooling mode by determining that the battery is in a condition that requires immediate cooling. The controller 9 continues the high-performance cooling mode until the detected battery temperature drops to or below T1. The controller 9 ends the high-performance cooling mode by determining that the battery temperature is as high as or lower than T1. Arrows of FIG. 2 indicate a flow of the refrigerant during the high-performance cooling mode.

In the high-performance cooling mode, the controller 9 controls the opening positions of the door 3 and the door 4 as is shown in FIG. 1 so as to form an air path allowing the first intake passage 16 and the exhaust passage 17 to communicate by way of the radiator 11 while controlling the solenoid valve 18 to be in a closed state and driving the compressor 10. Further, the controller 9 controls the opening positions of the door 5 and the door 6 so as to form an air path allowing the upstream passage 14 and the downstream passage 15 to communicate by way of the evaporator 13. Furthermore, the controller 9 drives the blower 2 and the electric fan 7.

Under the control as above, the high-pressure refrigerant discharged from the compressor 10 heats external air flowing from the first intake passage 16 toward the exhaust passage 17 by releasing heat to the external air in the radiator 11. The external air thus heated is exhausted to the outside of the vehicle interior again. In a case where a vehicle travel wind can let the external air flow from the first intake passage 16 toward the exhaust passage 17 in this instance, the controller 9 may control the electric fan 7 not to be driven but to be in a stopped state. It therefore becomes necessary to drive the electric fan 7 when no vehicle travel wind can be obtained on such occasions as when the vehicle is parked.

The refrigerant flowing out from the radiator 11 is decompressed in the decompressor 12. The decompressed refrigerant cools passing air by vaporizing and thereby absorbing heat from the passing air in the evaporator 13 and is subsequently sucked into the compressor 10. The passing air cooled in the evaporator 13 continues to circulate between the air passage passing through the heat exchanging portion 13a of the evaporator 13 and the battery passage of the assembled battery 8 and is kept cooled in the evaporator 13. The temperature-regulated air kept cooled in this manner can lower the temperature of the assembled battery 8 by absorbing heat from the electric cells when flowing through the battery passage of the assembled battery 8 and coming into contact with the surfaces or the electrode terminals of the electric cells. In short, in the high-performance cooling mode, air cooled in the evaporator 13 is provided to the assembled battery 8 as the temperature-regulated air and refrigerant heat released in the radiator 11 is exhausted to the outside of the vehicle interior.

The heating mode is a mode to exert high heating performance and performed when the detected battery temperature is below a second predetermined temperature T2. The second predetermined temperature T2 is set to a temperature lower than the first predetermined temperature T1, and below which temperature the original charging and discharging performance is hardly exerted. The second predetermined temperature T2 can be, for example, 10° C.

More specifically, when the controller 9 determines that the detected battery temperature is below 10° C., the controller 9 performs the heating mode by determining that the battery is in a condition that requires immediate warming up. The controller 9 continues the heating mode until the detected battery temperature rises to T2 or above. The controller 9 ends the heating mode by determining that the battery temperature is as high as or higher than T2. Arrows of FIG. 6 indicate a flow of the refrigerant in the heating mode.

In the heating mode, the controller 9 controls the opening positions of the door 3 and the door 4 as is shown in FIG. 5 so as to form an air path allowing the upstream passage 14 and the downstream passage 15 to communicate by way of the radiator 11 while controlling the solenoid valve 18 to be in a closed state and driving the compressor 10. Further, the controller 9 controls the opening positions of the door 5 and the door 6 so as to form an air path allowing the first intake passage 16 and the exhaust passage 17 to communicate by way of the evaporator 13. Furthermore, the controller 9 drives the blower 2 and the electric fan 7.

Under the control as above, the high-pressure refrigerant discharged from the compressor 10 heats passing air by releasing heat in the radiator 11. The air thus heated continues to circulate between the air passage passing through the heat exchanging portion 11a of the radiator 11 and the battery passage of the assembled battery 8 and is kept heated in the radiator 11. The temperature-regulated air kept heated in this manner can raise the temperature of the assembled battery 8 to warm up the assembled battery 8 by heating the electric cells when flowing through the battery passage of the assembled battery 8 and coming into contact with the surfaces or the electrode terminals of the electric cells.

The refrigerant flowing out from the radiator 11 is decompressed in the decompressor 12. The decompressed refrigerant cools passing air by vaporizing and thereby absorbing heat from the passing air in the evaporator 13 and is subsequently sucked into the compressor 10. The passing air cooled in the evaporator 13 is external air that flows from the first intake passage 16 toward the exhaust passage 17. The cooled external air is exhausted to the outside of the vehicle interior again. In this case, too, when a vehicle travel wind can let the external air flow from the first intake passage 16 toward the exhaust passage 17, the controller 9 may control the electric fan 7 not to be driven but to be in a stopped state. In this manner, in the heating operation, air is heated with the heat of external air absorbed in the evaporator 13 released in the radiator 11 and the air thus heated is provided to the assembled battery 8 as the temperature-regulated air.

The low-performance cooling mode is a mode to exert relatively low cooling performance and performed when the detected battery temperature falls within a predetermined temperature range from the second predetermined temperature T2 to the first predetermined temperature T1, both inclusive. The predetermined temperature range can be set to a range, for example, from 20° C. to 35° C., both inclusive. More specifically, when the controller 9 determines that the detected battery temperature is in a range from 20° C. to 35° C., both inclusive, the controller 9 performs the low-performance cooling mode by determining that the battery is in a condition that requires cooling but not in a condition that requires an abrupt temperature drop. The controller 9 continues the low-performance cooling mode until the detection battery temperature drops below 20° C. or exceeds 35° C. Arrows of FIG. 4 indicate a flow of the refrigerant in the low-performance cooling mode.

Figure 4:
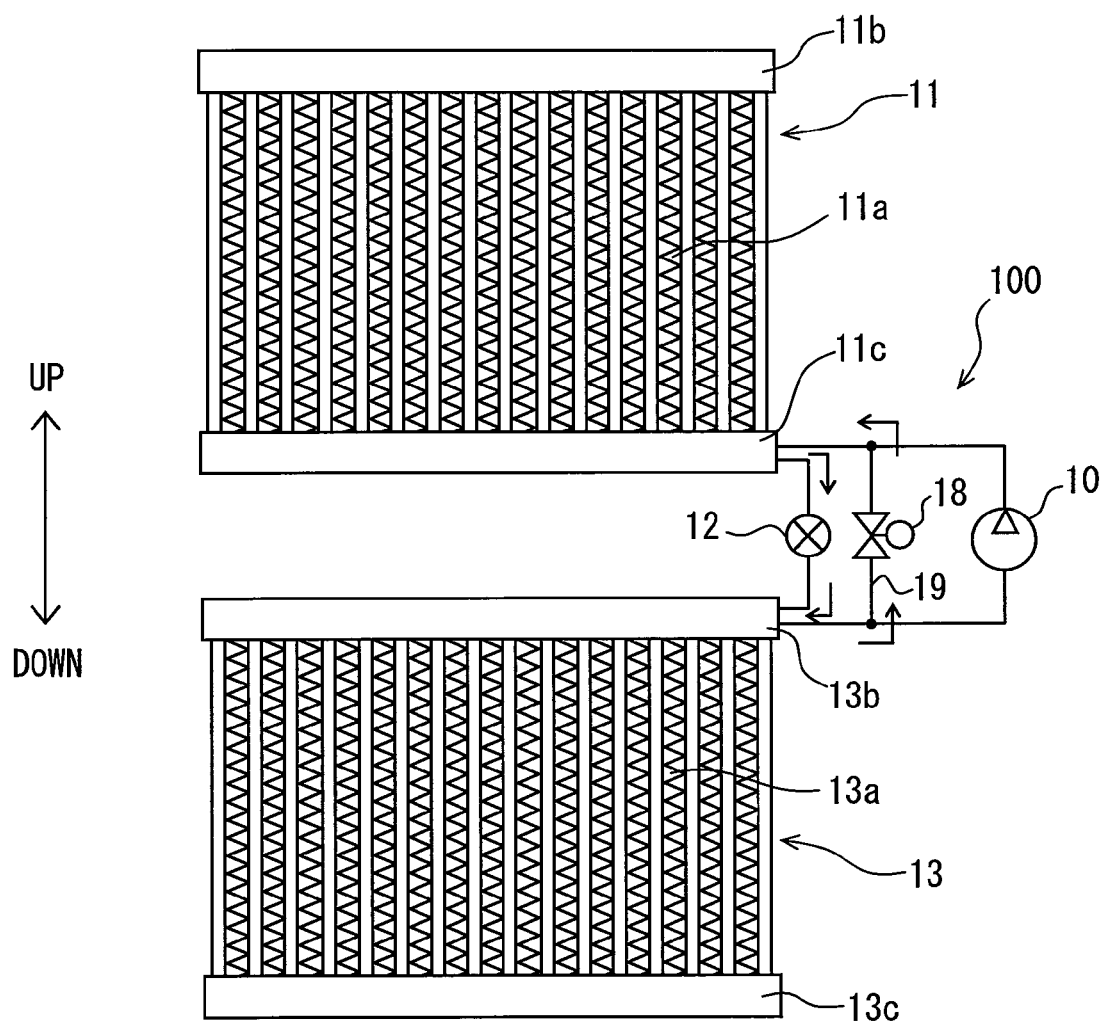
FIG. 4 is a schematic diagram showing an operation state of the refrigeration cycle in a low-performance cooling mode in the temperature regulation device of the first embodiment.

In the low-performance cooling mode, the controller 9 controls the opening positions of the door 3 and the door 4 as is shown in FIG. 1 so as to form an air path allowing the first intake passage 16 and the exhaust passage 17 to communicate by way of the radiator 11 while controlling the compressor 10 to be in a stopped state and the solenoid valve 18 to be in an open state as is shown in FIG. 4. Further, the controller 9 controls the opening positions of the door 5 and the door 6 so as to form an air path allowing the upstream passage 14 and the downstream passage 15 to communicate by way of the evaporator 13. Furthermore, the controller 9 drives the blower 2 and the electric fan 7.

Under the control as above, part of the refrigerant in the refrigeration cycle 100 remains as a liquid refrigerant in the evaporator 13 located lower than the radiator 11. This liquid refrigerant evaporates when hot air to be sent to the heat exchanging portion 13a of the evaporator 13 from the assembled battery 8 passes through the heat exchanging portion 13a and absorbs heat from the hot air. The hot air is thus cooled and supplied again to the battery passage of the assembled battery 8 to cool the battery.

The refrigerant evaporated in the evaporator 13 flows into the radiator 11 by passing the bypass passage 19 and is cooled to condense by the passing air in the heat exchanging portion 11a of the radiator 11. The refrigerant thus condensed flows under its own weight again into the evaporator 13 by way of the lower tank 11c of the radiator 11. The evaporation and condensation actions of the refrigerant as above take place repeatedly. Hence, the evaporator 13, the radiator 11, and the refrigerant pipes allowing a communication therebetween function as a heat pipe. Also, in a case where the opening-variable electronically-controlled expansion valve is used as the decompressor 12, the cooling performance in the evaporator 13 can be adjusted by controlling the opening of this expansion valve.

In the low-performance cooling mode, external air heated in the radiator 11 is exhausted to the outside of the vehicle interior again. In a case where a vehicle travel wind can let the external air flow from the first intake passage 16 toward the exhaust passage 17 in this instance, the controller 9 may control the electric fan 7 not to be driven but to be in a stopped state. It therefore becomes necessary to drive the electric fan 7 when no vehicle travel wind can be obtained on such occasions as when the vehicle is parked.

An operational advantage achieved by the temperature regulation device 1 of this embodiment will now be described. The temperature regulation device 1 includes the assembled battery 8, the blower 2 that sends the temperature-regulated air to the assembled battery 8, the doors 3 through 6 that change the air paths of the temperature-regulated air according to an operation mode, the radiator 11 that heats air to be sent to the temperature-regulation target in the heating mode, the evaporator 13 that cools air to be sent to the temperature-regulation target in the cooling mode, and the compressor 10. The evaporator 13 is installed at a lower position than the radiator 11 in the direction of gravitational force.

Owing to the configuration as above, even when the compressor 10 is not driven, that is, even when the refrigerant is not forcibly discharged, a heat pipe allowing evaporation and condensation of the refrigerant to repetitively take place, respectively, in the radiator 11 and the evaporator 13 can be formed. Hence, a cooling mode requiring no power can be performed in the temperature regulation control under circumstances where cooling performance so high as to drive the compressor is not required, for example, when the vehicle is parked or the vehicle is travelling at a low speed in the city or a residential area. In addition, noises to the environment can be reduced.

Also, the temperature regulation device 1 adopts the radiator 11 included in the refrigeration cycle 100 as an example of the heating heat exchanger and adopts the evaporator 13 included in the refrigeration cycle 100 as the cooling heat exchanger. Hence, a device capable of performing the low-performance cooling mode, the high-performance cooling mode, and the heating mode can be provided by making the use of a refrigeration cycle of a simple configuration. Because the refrigerant pipe configuration is also simple, the device can be more compact and the device achieves excellent mountability.

In a case where the refrigeration cycle 100 is used as a cycle independent from a refrigeration cycle for the air conditioning of the vehicle interior space, matching to the control on the air conditioning of the vehicle interior space is not necessary. Hence, the temperature regulation control corresponding to temperature regulation performance required for the temperature-regulation target can be performed.

Also, because the temperature regulation device 1 is of a configuration to let the temperature-regulated air circulate, not only can moisture, dust, and the like be prevented from flowing in from the outside, but also a heat loss of the temperature-regulated air can be reduced. Hence, a power-saving device can be provided.

The refrigeration cycle 100 of the temperature regulation device 1 has the bypass passage 19 connecting the evaporator 13 and the radiator 11 by bypassing the compressor 10 and the solenoid valve 18 enabling and disabling a flow of the refrigerant in the bypass passage 19. This configuration can provide the temperature regulation device 1 achieving the switching among the heating mode, the low-performance cooling mode, and the high-performance cooling mode by the control to switch the compressor 10 between a stopped state and an operating state and to switch the solenoid valve 18 between an open state and a closed state using a simple cycle configuration and a simple control specification.

Also, the outlet port (for example, the lower tank 11c) of the radiator 11 communicating with the evaporator 13 is located in a lower part of the radiator 11. According to this configuration, the refrigerant vaporized in the evaporator 13 condenses into a liquid in the radiator 11, and this liquid refrigerant is collected in a lower part of the radiator 11 under its own weight. The refrigerant can therefore be sent to the evaporator 13 in a reliable manner. Hence, the heat pipe function can be exerted effectively in a reliable manner.

When the temperature of the temperature-regulation target detected by the temperature detector exceeds the first predetermined temperature T1, the controller 9 performs the high-performance cooling mode by controlling the doors 3 through 6 and the blower 2 while driving the compressor 10. When the temperature of the temperature-regulation target detected by the temperature detector is below the second predetermined temperature T2 that is lower than the first predetermined temperature T1, the controller 9 performs the heating mode by controlling the doors 3 through 6 and the blower 2 while driving the compressor 10. When the temperature of the temperature-regulation target detected by the temperature detector falls within the predetermined temperature range from the second predetermined temperature T2 to the first predetermined temperature T1, both inclusive, the controller 9 controls the compressor 10 not to be driven but to be in a stopped state. Further, the controller 9 performs the low-performance cooling mode by controlling the doors 3 through 6 and the blower 2 so that air from which heat is absorbed in the evaporator 13 is sent to the temperature-regulation target.

According to the configuration as above, temperature regulation control corresponding to more than one performance level can be performed appropriately without wasting energy.

Herein, the temperature-regulation target is the secondary battery that stores electrical power to run the vehicle. Hence, power-saving and low-noise temperature regulation control can be performed effectively for a device, such as a battery, having a preset temperature range within which main functions (charging, discharging, and the like) can be exerted.

(Second Embodiment)

Figure 7:
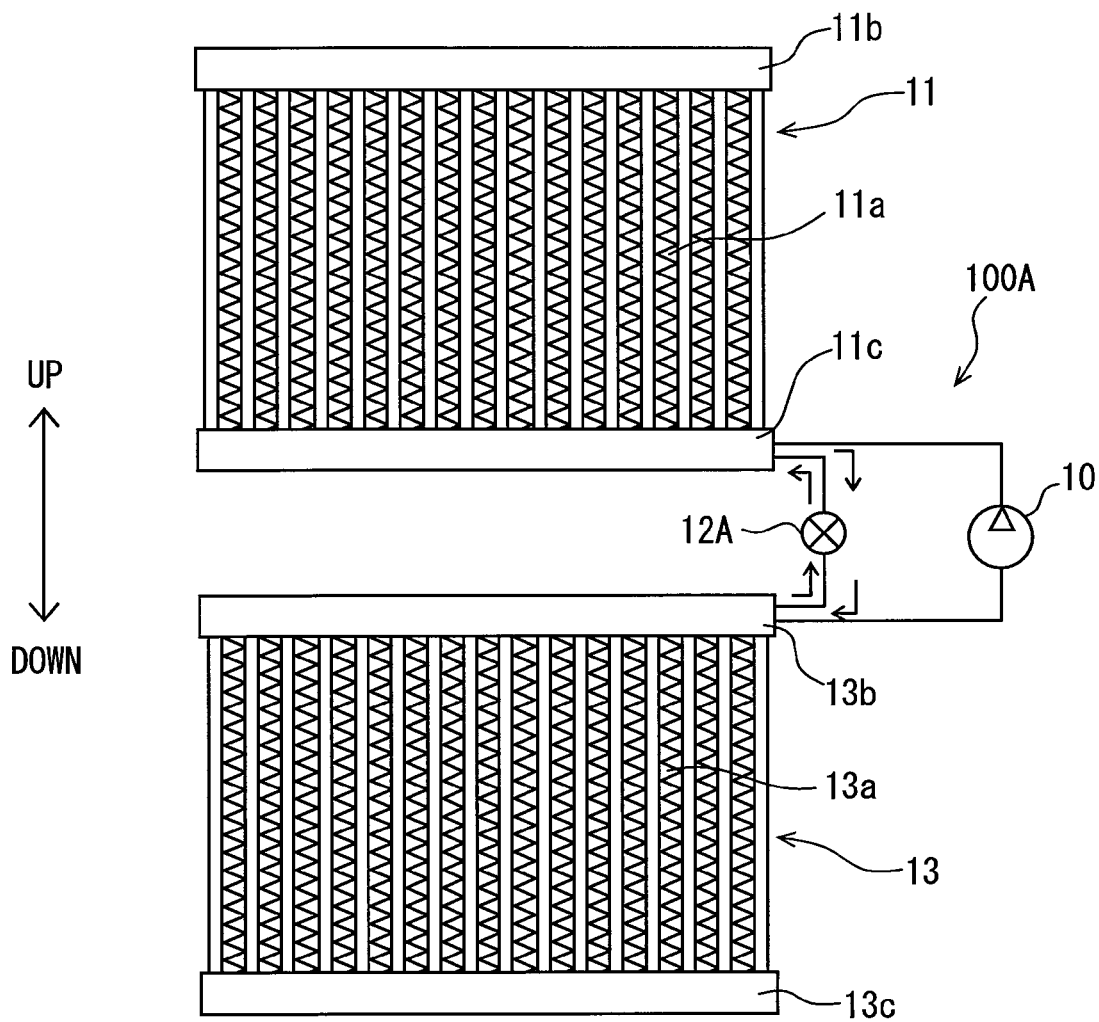
FIG. 7 is a schematic diagram showing an operation state of the refrigeration cycle in a low-performance cooling mode in a temperature regulation device according to a second embodiment of the present disclosure.

A second embodiment will describe a refrigeration cycle 100A as another configuration with respect to the first embodiment above with reference to FIG. 7. Components of FIG. 7 labeled with the same reference numerals as those in the drawings referred to in the first embodiment above are the same components and an operational advantage is also the same. Hereinafter, a configuration, a processing procedure, and an operation different from those in the first embodiment above will be described.

The refrigeration cycle 100A is different from the refrigeration cycle 100 of the first embodiment above in that the bypass passage 19 and the solenoid valve are omitted and that a decompressor 12A is an opening-variable electronically-controlled expansion valve. An opening of the decompressor 12A is controlled by a controller 9.

In the low-performance cooling mode described above, the decompressor 12A is opened and a compressor 10 is controlled to be in a stopped state, and a refrigerant evaporated in an evaporator 13 flows into a radiator 11 by flowing through a passage to which the decompressor 12A is installed and which connects the evaporator 13 and the radiator 11, and condenses in a heat exchanging portion 11a of the radiator 11. The condensed refrigerant returns to the evaporator 13 again under its own weight by way of a lower tank 11c of the radiator 11 by passing the same passage. Hence, because a gas of the refrigerant and a liquid of the refrigerant flow through the same passage in opposite directions, refrigerant pipes, to which the evaporator 13, the radiator 11, and the decompressor 12A are installed, function as a heat pipe.

According to the second embodiment, a refrigeration cycle requiring neither a bypass passage bypassing the compressor 10 nor a solenoid valve or the like enabling and disabling a flow of the refrigerant in the bypass passage can be formed. Hence, the number of components can be reduced and mountability to the vehicle can be enhanced.

(Third Embodiment)

Figure 8:
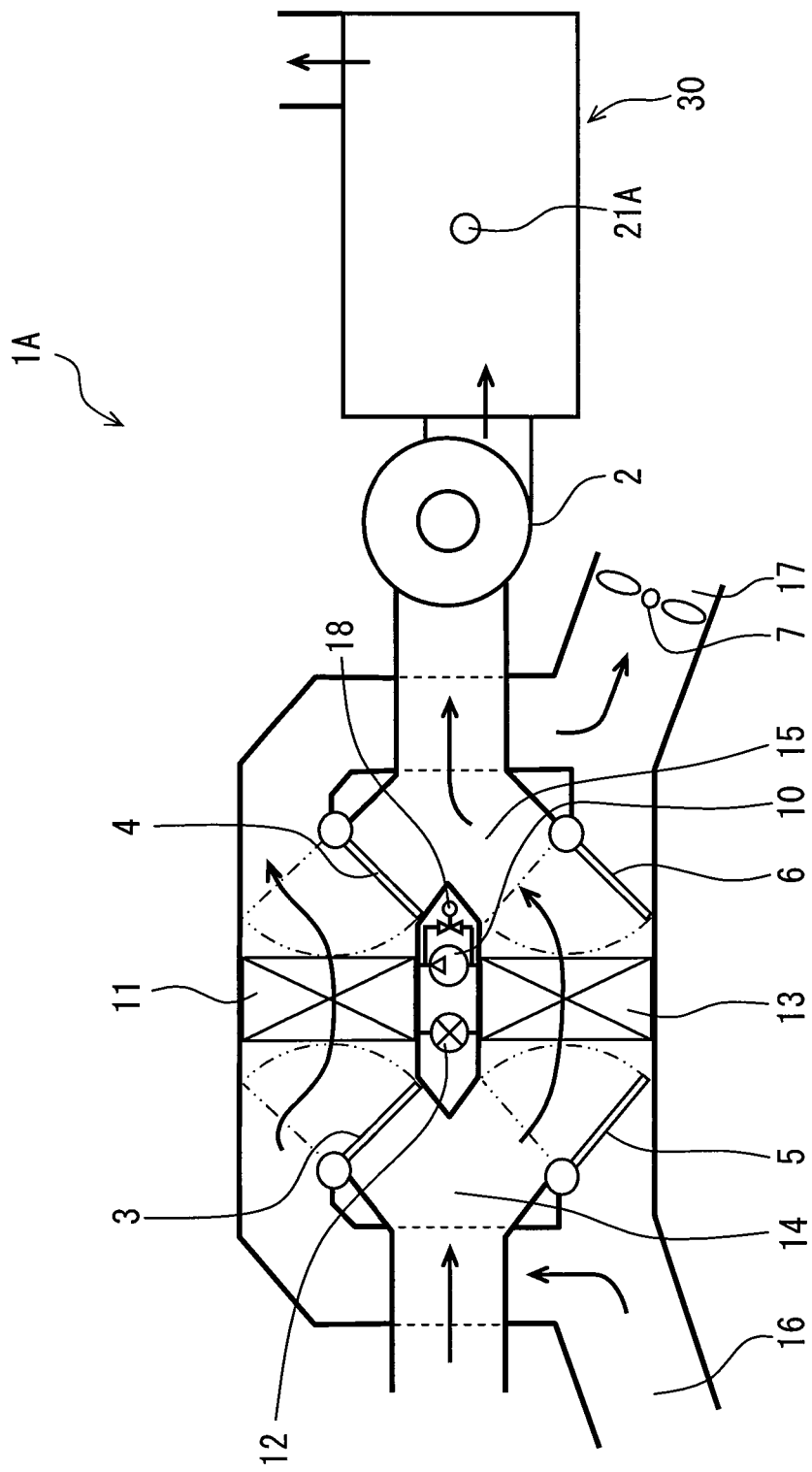
FIG. 8 is a schematic diagram showing the temperature regulation device according to the third embodiment of the present disclosure.

A third embodiment will describe a temperature regulation device 1A as another configuration with respect to the first embodiment above with reference to FIG. 8. Components of FIG. 8 labeled with the same reference numerals as those in the drawings referred to in the first embodiment above are the same components and an operational advantage is also the same. Hereinafter, a configuration, a processing procedure, and an operation different from those in the first embodiment above will be described. FIG. 8 shows operation states of the respective portions and flows of air in a high-performance cooling mode.

The temperature regulation device 1A is different from the temperature regulation device 1 of the first embodiment above in that an example of a temperature-regulation target is a vehicle interior space 30. Further, the temperature regulation device 1A lets in air on the outside of the vehicle interior or air in the vehicle interior space 30 and supplies the air to the vehicle interior space 30 after the temperature is regulated in the evaporator 13 or the radiator 11, after which the temperature regulation device 1A exhausts the air to the outside of the vehicle interior or lets the air circulate again (internal air circulation mode). Accordingly, the upstream passage 14, for example, is connected to an internal and external air switching device. In the case of an external air introduction mode, the internal and external air switching device is switched to let in air (external air) on the outside of the vehicle interior so that the external air flows into the upstream passage 14. In the case of an internal air introduction mode, the internal and external air switching device is switched to let in air (internal air) in the vehicle interior space 30 so that the air in the vehicle interior space 30 flows into the upstream passage 14. The vehicle interior space 30 is provided with a vehicle interior temperature sensor 21A that detects a temperature of the vehicle interior space 30. The vehicle interior temperature sensor 21A is an example of a device temperature detector that detects a temperature of the temperature-regulation target.

In seasons like spring and autumn when a cooling load is low, a vehicle air-conditioning device to which the present disclosure is not applied performs control either to drive a compressor in a refrigeration cycle or to send air alone to the vehicle interior space by stopping the compressor. In contrast, according to the third embodiment, the temperature regulation device 1A can obtain cooling performance for the vehicle interior space without having to drive the compressor by letting the heat pipe function described above be exerted. Hence, comfort of the passenger(s) can be ensured by a power-saving operation.

Because the temperature-regulation target of the temperature regulation device 1B is the vehicle interior space 30, a moderate cooling function can be exerted in the air-conditioning operation for the vehicle interior space by performing the low-performance cooling mode.

(Fourth Embodiment)

A fourth embodiment will describe a temperature regulation device 1B as another configuration with respect to the first embodiment above with reference to FIG. 9 through FIG. 15. Components of the respective drawings labeled with the same reference numerals as those in the drawings referred to in the first embodiment above are the same components and an operational advantage is also the same. Hereinafter, a configuration, a processing procedure, and an operation different from those in the first embodiment above will be described.

The temperature regulation device 1B is different from the temperature regulation device 1 of the first embodiment above in that a temperature-regulation target is an assembled battery 8 and an interior. The temperature regulation device 1B can provide an air-conditioning wind to the interior and also provide temperature-regulated air to the assembled battery 8. In short, the temperature regulation device 1B can exert a temperature regulation function for more than one temperature-regulation target.

The fourth embodiment uses the assembled battery 8 and the vehicle interior as an example of multiple temperature-regulation targets. For example, in the case of the assembled battery 8 mounted on the vehicle, high-performance cooling for the battery is necessary only in a limited circumstance where inputs and outputs of the battery are large on such occasions as when rapid charging is taking place and the vehicle is climbing a hill. Also, heating for the battery is necessary only during warming up before the vehicle starts traveling or before the charging takes place. Hence, the temperature regulation device 1B exerts the temperature regulation function in a case where cooling or heating of the battery (example of an in-vehicle device) is not required but air conditioning of the vehicle interior space and temperature regulation of another temperature-regulation target (for example, an in-vehicle device including an inverter, a charger, and a motor) are required.

As a configuration to furnish the temperature regulation function for multiple temperature-regulation targets, the temperature regulation device 1B has a second supply passage 26 (interior supply passage) branched from a first supply passage 24 (battery supply passage) connecting an outlet port of a blower 2 and an inlet port of the assembled battery 8. The second supply passage 26 is a passage communicating with the vehicle interior space. Further, the temperature regulation device 1B has a second intake passage 23 (internal air intake passage) merged into a return passage 20 connecting an outlet port of the assembled battery 8 and an inlet port of an upstream passage 14. The return passage 20 is a passage that air supplied to the assembled battery 8 by passing the second supply passage 26 passes when returning again to the upstream passage 14. The second intake passage 23 is a passage communicating with the vehicle interior space and it is a passage where air in the vehicle interior space (referred to also as the internal air) passes when let into the temperature regulation device 1B.

The first supply passage 24 is closed and opened by a door 25. The second supply passage 26 is closed and opened by the door 25. In the fourth embodiment, the door 25 closes the first supply passage 24 and opens the second supply passage 26 at the same time and conversely closes the second supply passage 26 and opens the first supply passage 24 at the same time. The door 25 is controlled to be at a position indicated by an alternate long and two short dashes line shown in FIG. 9 when closing the first supply passage 24 and at a position indicted by a solid line shown in FIG. 9 when closing the second supply passage 26.

The door 25 is an example of a setting device that switches targets to which temperature-regulated air is supplied. The opening position of the door 25 is controlled by the controller 9 described above. The controller 9 is formed to enable communications with an air-conditioning ECU 40 that controls an air-conditioning operation for the vehicle interior space and switches a target to which temperature-regulated air is supplied to the vehicle interior space in response to an air conditioning request from the air-conditioning ECU 40. More specifically, when a performance condition of any one of the high-performance cooling mode, the low-performance cooling mode, and the heating mode described above is established and no air conditioning request is received from the air-conditioning ECU 40, the controller 9 controls the door 25 to close the second supply passage 26 and open the first supply passage 24. Upon receipt of an air conditioning request from the air-conditioning ECU 40, the controller 9 controls the door 25 to open the second supply passage 26 and close the first supply passage 24.

The return passage 20 is closed and opened by the door 22. The second intake passage 23 is closed and opened by the door 22. In the fourth embodiment, the door 22 closes the return passage 20 and opens the second intake passage 23 at the same time and conversely closes the second intake passage 23 and opens the return passage 20 at the same time. The door 22 is controlled to be at a position indicated by an alternate long and two short dashes line shown in FIG. 9 when closing the return passage 20 and at a position indicted by a solid line shown in FIG. 9 when closing the second intake passage 23.

The door 22 is switched according to a target to which the temperature-regulated air is supplied. The opening position of the door 22 is controlled by the controller 9 as with the door 25. More specifically, when the performance condition of any one of the high-performance cooling mode, the low-performance cooling mode, and the heating mode described above is established and no air conditioning request is received from the air-conditioning ECU 40, the controller 9 controls the door 22 to close the second intake passage 23 and open the return passage 20. Upon receipt of an air conditioning request from the air-conditioning ECU 40, the controller 9 controls the door 22 to open the second intake passage 23 and close the return passage 20.

Respective modes performed by the temperature regulation device 1B will now be described.

Figure 9:
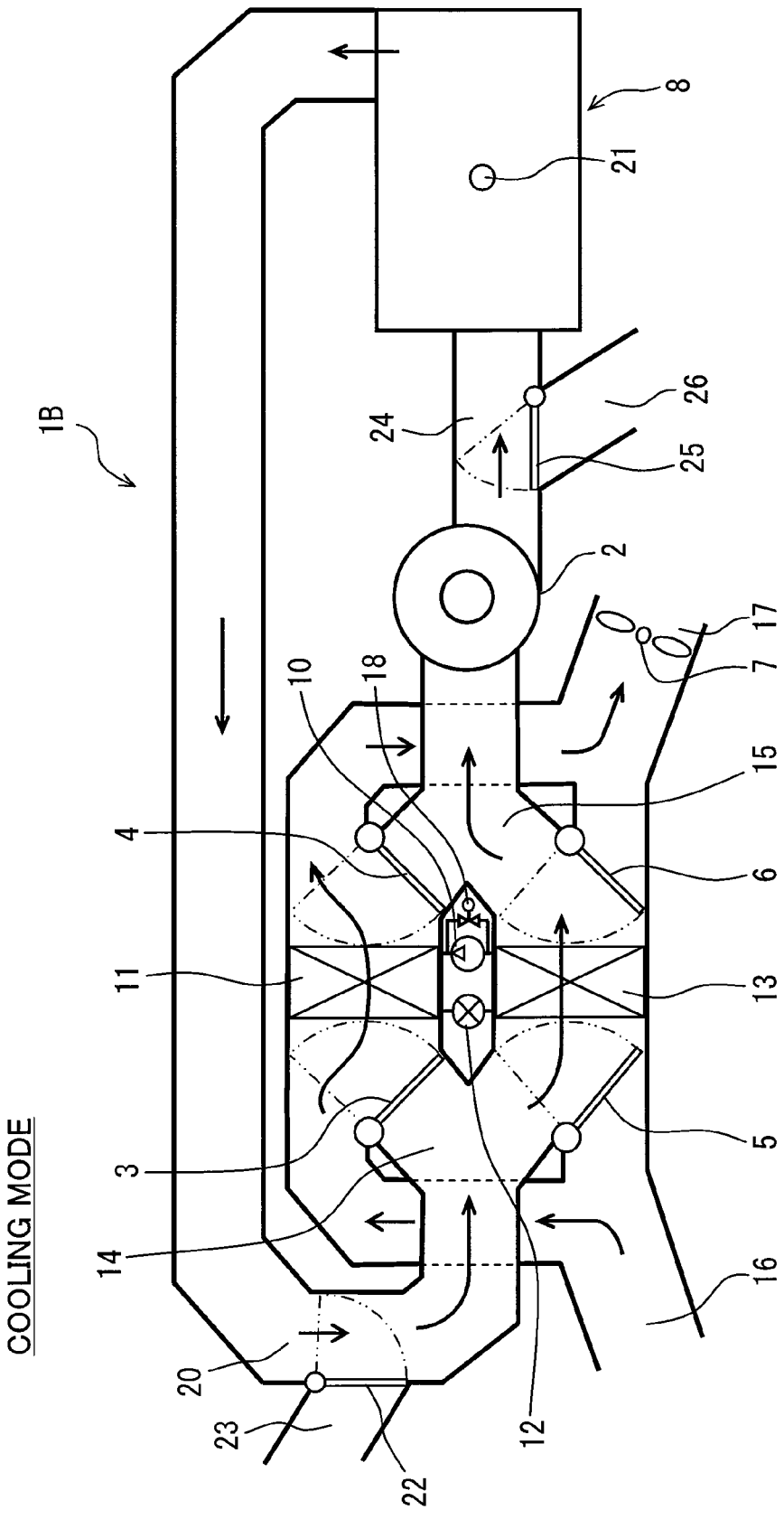
FIG. 9 is a schematic diagram showing an operation state of a temperature regulation device in a cooling mode according to a fourth embodiment of the present disclosure.
Figure 10:
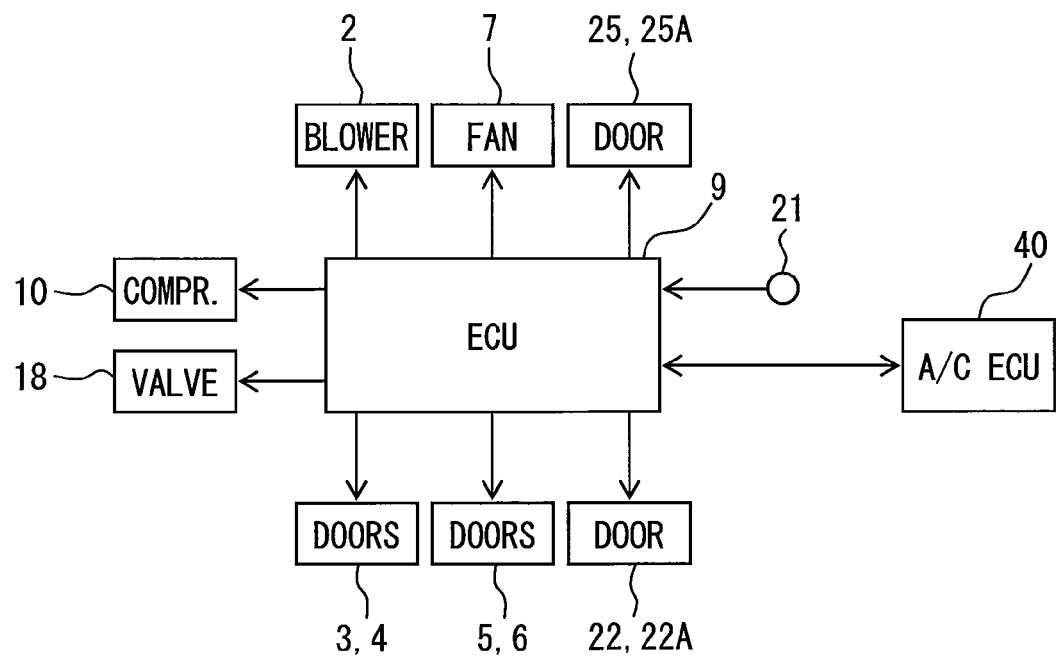
FIG. 10 is a block diagram showing a control configuration with respect to temperature regulation devices of the fourth embodiment and a fifth embodiment.

FIG. 9 shows operation states of the respective portions and flows of air in the high-performance cooling mode to cool the battery. In the high-performance cooling mode for the battery, the controller 9 controls the opening positions of the door 3 and the door 4 as shown in FIG. 9 so as to form an air path allowing the first intake passage 16 and the exhaust passage 17 to communicate by way of the radiator 11 while controlling the solenoid valve 18 to be in a closed state and driving the compressor 10. Further, the controller 9 controls the opening positions of the door 5 and the door 6 so as to form an air path allowing the upstream passage 14 and the downstream passage 15 to communicate by way of the evaporator 13. Furthermore, the controller 9 controls the opening positions of the door 22 and the door 25 so as to close the second intake passage 23 and the second supply passage 26, respectively, while driving the blower 2 and an electric fan 7.

Under the control as above, the high-pressure refrigerant discharged from the compressor 10 heats external air flowing from the first intake passage 16 toward the exhaust passage 17 by releasing heat to the external air in the radiator 11. The external air thus heated is exhaust to the outside of the vehicle interior again.

The refrigerant flowing out from the radiator 11 is decompressed in a decompressor 12. The decompressed refrigerant cools passing air in the evaporator 13 and is subsequently sucked into the compressor 10. The passing air cooled in the evaporator 13 continues to circulate in a circuit formed of air passages or the like in the first supply passage 24, the assembled battery 8, the return passage 20, and the evaporator 13 and is kept cooled in the evaporator 13. The temperature-regulated air kept cooled in this manner can lower the temperature of the assembled battery 8 by absorbing heat from electric cells when flowing through a battery passage of the assembled battery 8 and coming into contact with the surfaces or the electrode terminals of the electric cells.

Figure 11:
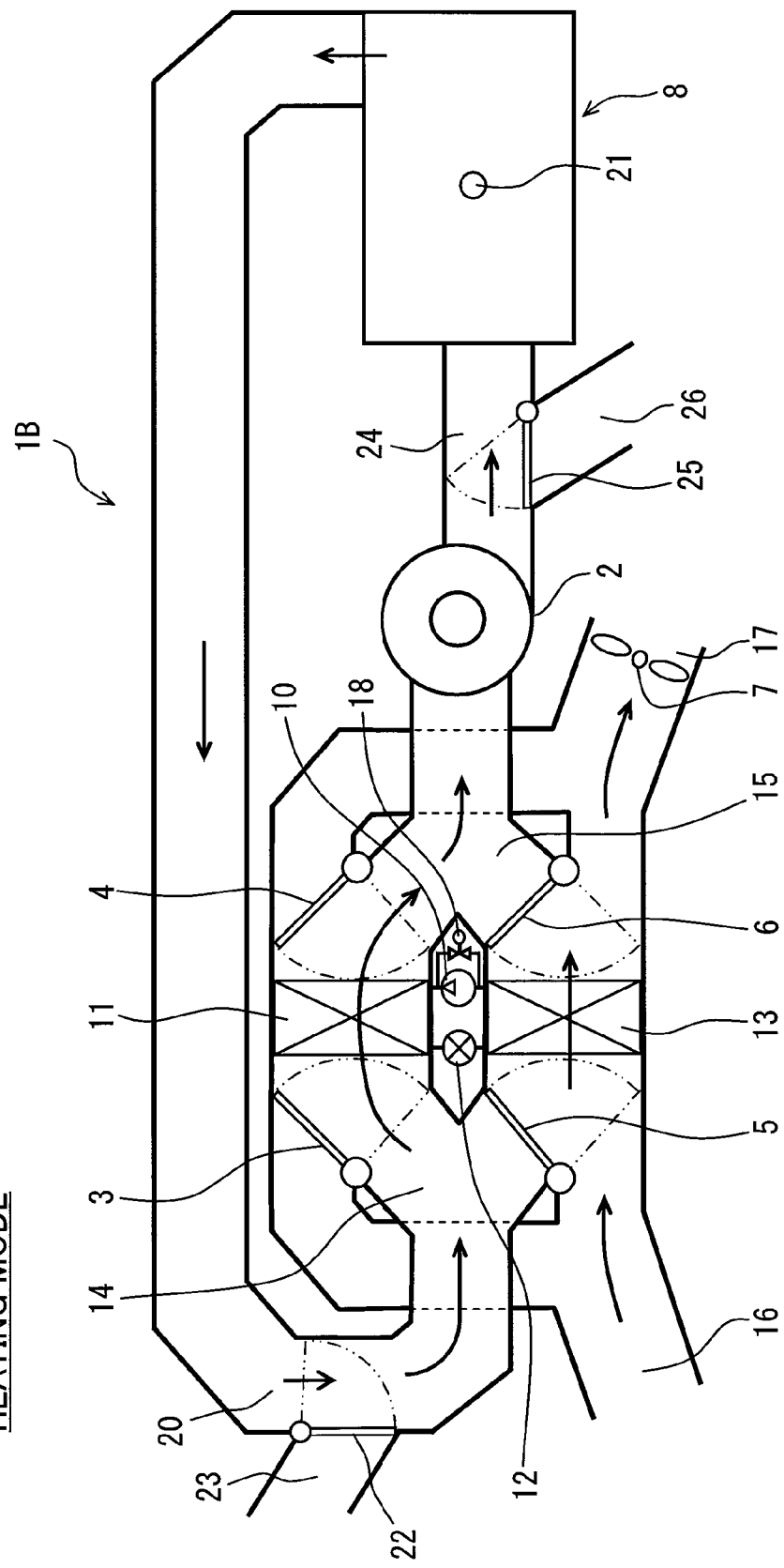
FIG. 11 is a schematic diagram showing an operation state of the temperature regulation device in a heating mode in the fourth embodiment.

FIG. 11 shows operation states of the respective portions and flows of air in the heating mode to heat the battery. In the heating mode, the controller 9 controls the opening positions of the door 3 and the door 4 as is shown in FIG. 11 so as to form an air path allowing the upstream passage 14 and the downstream passage 15 to communicate by way of the radiator 11 while controlling the solenoid valve 18 to be in a closed state and driving the compressor 10. Further, the controller 9 controls the opening positions of the door 5 and the door 6 so as to form an air path allowing the first intake passage 16 and the exhaust passage 17 to communicate by way of the evaporator 13. Furthermore, the controller 9 controls the opening positions of the door 22 and the door 25 so as to close the second intake passage 23 and the second supply passage 26, respectively, while driving the blower 2 and the electric fan 7.

Under the control as above, the high-pressure refrigerant discharged from the compressor 10 heats passing air by releasing heat in the radiator 11. The passing air heated in the radiator 11 continues to circulate in a circuit formed of air passages or the like in the first supply passage 24, the assembled battery 8, the return passage 20, and the radiator 11 and is kept heated in the radiator 11. The temperature-regulated air kept heated in this manner can raise a temperature of the assembled battery 8 and warm up the assembled battery 8 by heating the electric cells when flowing through the battery passage of the assembled battery 8 and coming into contact with the surfaces or the electrode terminals of the electric cells.

The refrigerant flowing out from the radiator 11 is decompressed in the decompressor 12. The decompressed refrigerant cools passing air in the evaporator 13 and is subsequently sucked into the compressor 10. The passing air cooled in the evaporator 13 is external air flowing from the first intake passage 16 toward the exhaust passage 17 and this cooled external air is exhausted to the outside of the vehicle interior again.

Figure 12:
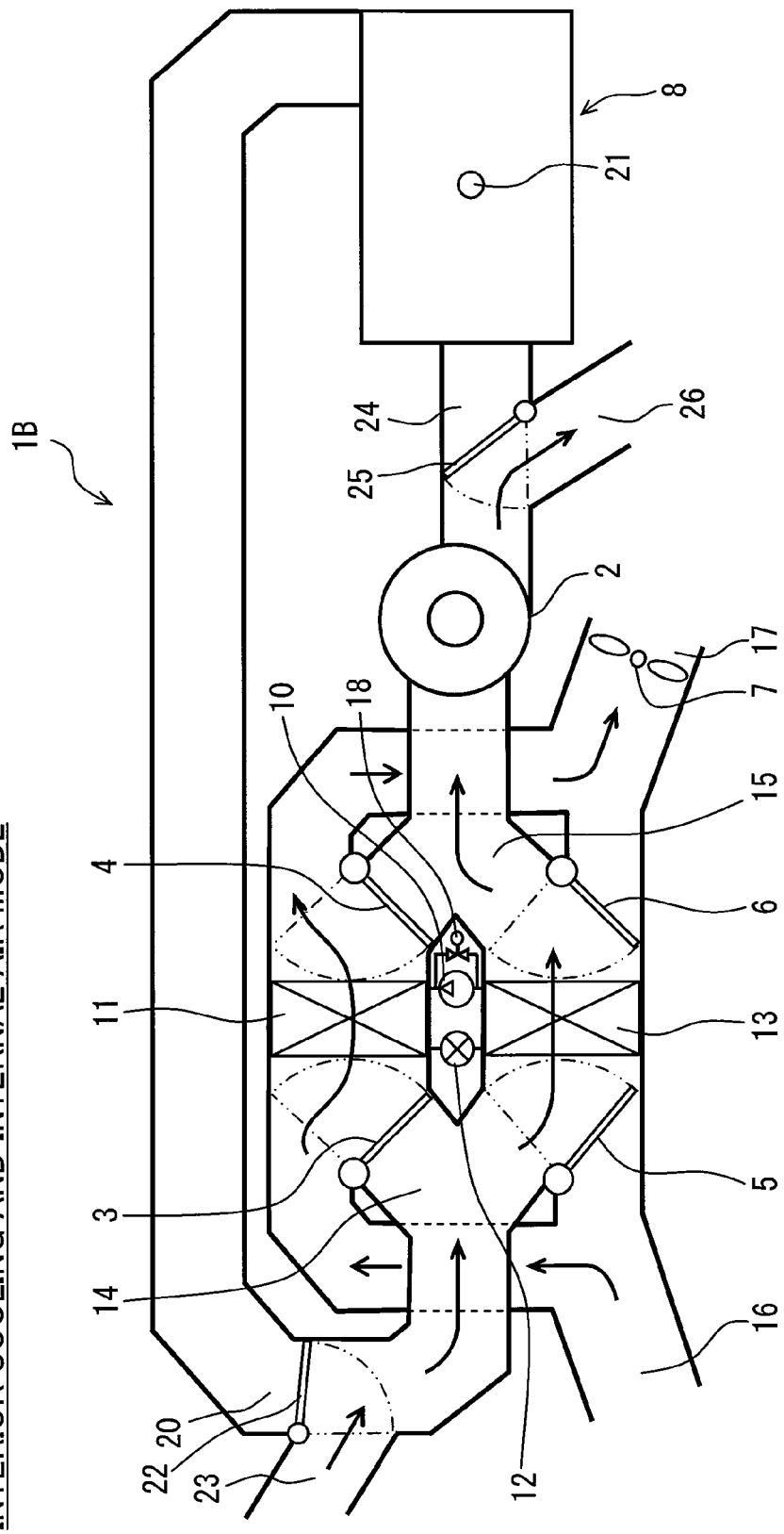
FIG. 12 is a schematic diagram showing an operation state of the temperature regulation device in an interior cooling and internal air mode in the fourth embodiment.

FIG. 12 shows operation states of the respective portions and flows of air in the cooling mode in which an interior cooling mode and an internal air circulation mode are performed. Upon receipt of a communication signal relating to an air conditioning request for the vehicle interior space from the air-conditioning ECU 40 when the assembled battery 8 does not require cooling (in a mode other than the cooling mode described above), the controller 9 provides the temperature-regulated air not to the assembled battery 8 but to the vehicle interior space. This is a case where a request of the internal air circulation mode is received from the air-conditioning ECU 40 and the controller 9 performs an interior cooling and internal air mode. The air conditioning of the vehicle interior space provided by the temperature regulation device 1B in this instance may function as secondary air conditioning to support the air conditioning of the vehicle interior space by a vehicle air-conditioning device mounted on the vehicle or may function as primary air conditioning to provide air conditioning to the vehicle interior space instead of the vehicle air-conditioning device. In either case, the controller 9 performs the mode according to an air conditioning request from the air-conditioning ECU 40.

In the interior cooling and internal air mode, the opening positions of the door 3 and the door 4 are controlled as is shown in FIG. 12 so as to form an air path allowing the first intake passage 16 and the exhaust passage 17 to communicate by way of the radiator 11 while the solenoid valve 18 is controlled to be in a closed state and the compressor 10 is driven. Further, the opening positions of the door 5 and the door 6 are controlled so as to form an air path allowing the upstream passage 14 and the downstream passage 15 to communicate by way of the evaporator 13. Furthermore, the opening positions of the door 22 and the door 25 are controlled so as to close the return passage 20 and the first supply passage 24, respectively, while the blower 2 and the electric fan 7 are driven.

Under the control as above, the high-pressure refrigerant discharged from the compressor 10 heats external air flowing from the first intake passage 16 toward the exhaust passage 17 by releasing heat to the external air in the radiator 11. The external air thus heated is exhausted to the outside of the vehicle interior again.

The refrigerant flowing out from the radiator 11 is decompressed in the decompressor 12. The decompressed refrigerant cools passing air in the evaporator 13 and is subsequently sucked into the compressor 10. The passing air cooled in the evaporator 13 continues to circulate in a circuit formed of air passages or the like in the second supply passage 26, the vehicle interior space, the second intake passage 23, and the evaporator 13 and is kept cooled in the evaporator 13. The temperature-regulated air kept cooled in this manner is supplied to the vehicle interior space to provide air conditioning and serves as the secondary air conditioning or the primary air conditioning described above.

Descriptions will now be given to operation states of the respective portions and flows of air in the cooling mode in which the interior cooling mode and an external air introduction mode are performed. An example shown in FIG. 13 is a case where a request of the external air introduction mode is received from the air-conditioning ECU 40.

Figure 13:
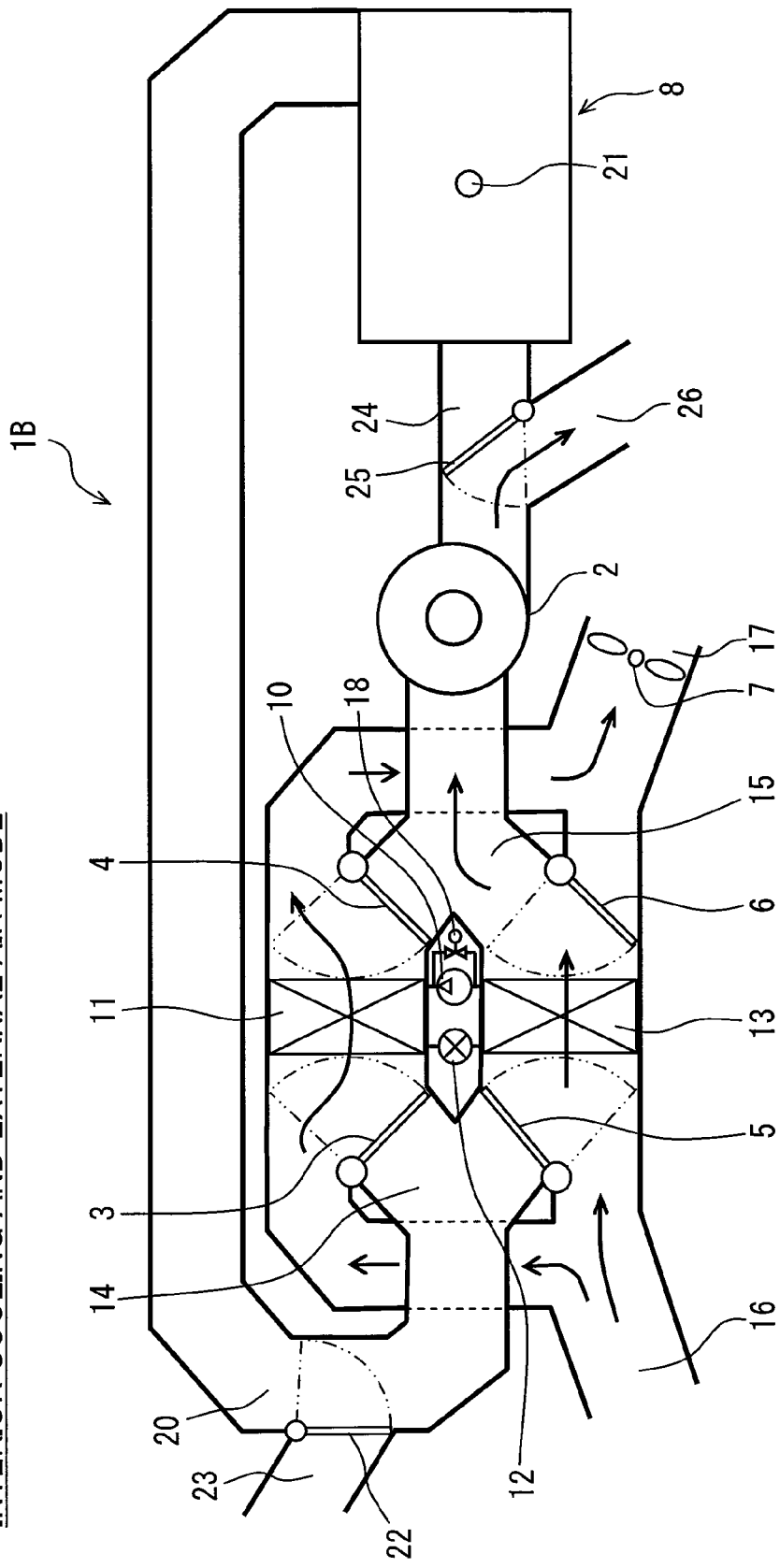
FIG. 13 is a schematic diagram showing an operation state of the temperature regulation device in an interior cooling and external air mode in the fourth embodiment.

In the interior cooling and external air mode, the opening positions of the door 3 and the door 4 are controlled as is shown in FIG. 13 so as to form an air path allowing the first intake passage 16 and the exhaust passage 17 to communicate by way of the radiator 11 while the solenoid valve 18 is controlled to be in a closed state and the compressor 10 is driven. Further, the opening positions of the door 5 and the door 6 are controlled so as to form an air path allowing the first intake passage 16 and the downstream passage 15 to communicate by way of the evaporator 13. Furthermore, the opening positions of the door 22 and the door 25 are controlled so as to close the second intake passage 23 and the first supply passage 24, respectively, while the blower 2 and the electric fan 7 are driven.

Under the control as above, the high-pressure refrigerant discharged from the compressor 10 heats external air flowing from the first intake passage 16 toward the exhaust passage 17 by releasing heat to the external air in the radiator 11. The external air thus heated is exhausted to the outside of the vehicle interior again.

The refrigerant flowing out from the radiator 11 is decompressed in the decompressor 12. The decompressed refrigerant cools passing air in the evaporator 13 and is subsequently sucked into the compressor 10. Part of the external air after passing the first intake passage 16 is cooled in the evaporator 13 and subsequently supplied to the vehicle interior space by way of the downstream passage 15 by flowing through the second supply passage 26. The external air let in from the outside of the vehicle interior in this manner is cooled in the evaporator 13 and subsequently supplied to the vehicle interior space while the temperature-regulated air supplied by the temperature regulation device 1B provides the air conditioning to the vehicle interior space and serves as the secondary air conditioning or the primary air conditioning described above.

Descriptions will now be given to operation states of the respective portions and flows of air in the heating mode in which an interior heating mode and the internal air circulation mode are performed. An example shown in FIG. 14 is a case where a request of a heating and internal air circulation mode is received from the air-conditioning ECU 40.

Figure 14:
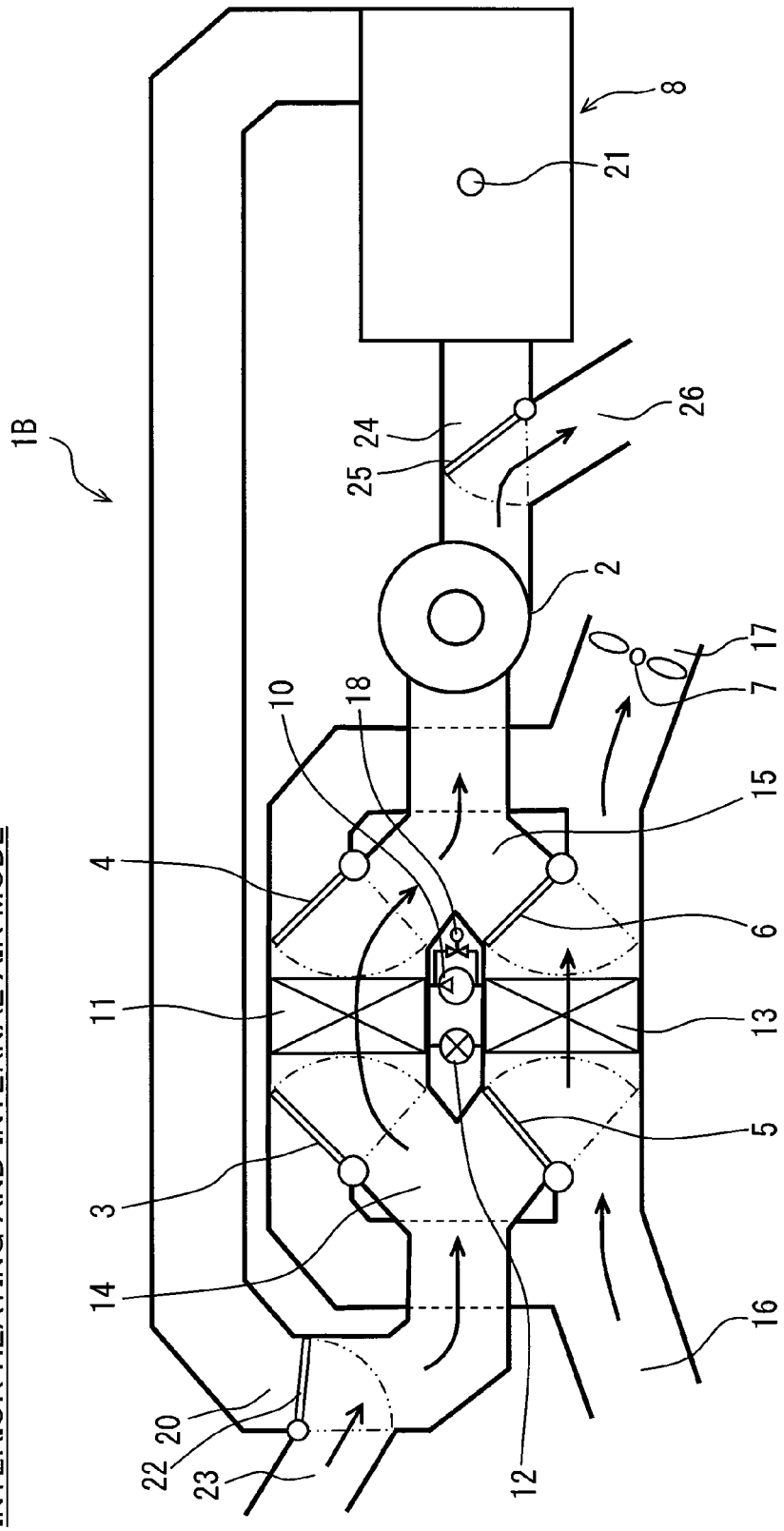
FIG. 14 is a schematic diagram showing an operation state of the temperature regulation device in an interior heating and internal air mode in the fourth embodiment.

In the interior heating and internal air mode, the opening positions of the door 5 and the door 6 are controlled as is shown in FIG. 14 so as to form an air path allowing the first intake passage 16 and the exhaust passage 17 to communicate by way of the evaporator 13 while the solenoid valve 18 is controlled to be in a closed state and the compressor 10 is driven. Further, the opening positions of the door 3 and the door 4 are controlled so as to form an air path allowing the upstream passage 14 and the downstream passage 15 to communicate by way of the radiator 11. Furthermore, the opening positions of the door 22 and the door 25 are controlled so as to close the return passage 20 and the first supply passage 24, respectively, while the blower 2 and the electric fan 7 are driven.

Under the control as above, the high-pressure refrigerant discharged from the compressor 10 heats air to be supplied to the vehicle interior space by releasing heat in the radiator 11. The passing air thus heated in the radiator 11 continues to circulate in a circuit formed of air passages or the like in the second supply passage 26, the vehicle interior space, the second intake passage 23, and the radiator 11 and is kept heated in the radiator 11. The refrigerant flowing out from the radiator 11 is decompressed in the decompressor 12. The decompressed refrigerant cools passing air in the evaporator 13 and is subsequently sucked into the compressor 10. The passing air cooled in the evaporator 13 is external air after passing the first intake passage 16, which is exhausted to the outside of the vehicle interior again by passing the exhaust passage 17. The temperature-regulated air kept heated in this manner is supplied to the vehicle interior space to provide the air conditioning and serves as the secondary air conditioning or the primary air conditioning described above.

Descriptions will now be given to operation states of the respective portions and flows of air in the heating mode in which the interior heating mode and the external air introduction mode are performed. An example shown in FIG. 15 is a case where a request for a heating and external air introduction mode is received from the air-conditioning ECU 40.

In the interior heating and external air mode, the opening positions of the door 5 and the door 6 are controlled as is shown in FIG. 15 so as to form an air path allowing the first intake passage 16 and the exhaust passage 17 to communicate by way of the evaporator 13 while the solenoid valve 18 is controlled to be in a closed state and the compressor 10 is driven. Further, the opening positions of the door 3 and the door 4 are controlled so as to form an air path allowing the first intake passage 16 and the downstream passage 15 to communicate by way of the radiator 11. Furthermore, the opening positions of the door 22 and the door 25 are controlled so as to close the second intake passage 23 and the first supply passage 24, respectively, while the blower 2 and the electric fan 7 are driven.

Under the control as above, the high-pressure refrigerant discharged from the compressor 10 heats external air flowing from the first intake passage 16 toward the second supply passage 26 by releasing heat in the radiator 11. The passing air (external air) heated in the radiator 11 is supplied to the vehicle interior space. Also, the refrigerant flowing out from the radiator 11 is decompressed in the decompressor 12. The decompressed refrigerant cools passing air in the evaporator 13 and is subsequently sucked into the compressor 10. The passing air cooled in the evaporator 13 is part of the external air after passing the first intake passage 16, which is exhausted to the outside of vehicle interior again by way of the exhaust passage 17. The external air let in from the outside of vehicle interior in this manner is cooled in the evaporator 13 and sent to the outside of the vehicle interior in part, and the rest is heated in the radiator 11 and supplied to the vehicle interior space. The temperature-regulated air by the temperature regulation device 1B provides the air conditioning to the vehicle interior space and serves as the secondary air conditioning or the primary air conditioning described above.

An operational advantage obtained by the temperature regulation device 1B of the fourth embodiment will now be described. According to the temperature regulation device 1B, multiple different temperature-regulation targets are set as the temperature-regulation target. The temperature regulation device 1B has the setting device (door 25) that sets a sending destination of the temperature-regulated air to at least one of the multiple temperature-regulation targets.

Owing to this configuration, a device capable of performing temperature regulation effectively by selecting a target that requires cooling or heating at the present moment from the multiple temperature-regulation targets can be provided.

According to the temperature regulation device 1B, the multiple temperature-regulation targets include the vehicle interior space and an in-vehicle device (the assembled battery 8, an inverter, a charger, a motor, or the like). When the in-vehicle device does not require temperature regulation and a request of temperature regulation for the vehicle interior space is received from the air-conditioning ECU 40 in the vehicle air-conditioning device, the setting device (the door 25) sets the sending destination of the temperature-regulated air to the vehicle interior space.

Accordingly, the temperature regulation device 1B can be used as a secondary device for the air conditioning of the vehicle interior space and the air conditioning performance can be upgraded in response to a request from the air-conditioning device side. Hence, the temperature regulation device 1B can be used effectively also as a device that enhances the comfort of the passenger(s). Also, by effectively using the temperature regulation device 1B for a request of a rapid drop of the vehicle interior temperature (during cooling down) and a request for a rapid rise of the vehicle interior temperature (during warming up), a time required for cooling down and warming up can be shortened.

Also, by using the temperature regulation device 1B together with the vehicle air-conditioning device for an air-conditioning operation, maximum performance required for a compressor in the vehicle air-conditioning device can be suppressed. Hence, the compressor can be more compact and mountability to the vehicle can be enhanced.

For the compressor in the vehicle air-conditioning device, the maximum performance is normally set according to performance required for cooling down or warming up. Hence, efficiency of the compressor may possibly be deteriorated due to a reduction of the rotation number or a reduction of a discharge capacity during an operation at medium performance and low performance performed at relatively high frequency. However, a highly efficient air-conditioning operation can be performed even at medium performance by supporting the air-conditioning performance of the vehicle air-conditioning device during cooling down or warming up by the temperature regulation device 1B.

(Fifth Embodiment)

A fifth embodiment will describe a temperature regulation device 1C as another configuration with respect to the fourth embodiment with reference to FIG. 16 and FIG. 17. Components of the respective drawings labeled with the same reference numerals as those in the drawings referred to in the fourth embodiment above are the same components and an operational advantage is also the same. Hereinafter, a configuration, a processing procedure, and an operation different from those in the fourth embodiments will be described.

The temperature regulation device 1C is different from the temperature regulation device 1B of the fourth embodiment above in that each of a door 22A and a door 25A is furnished with a function of not only switching closing and opening states of two passages but also opening the both passages. More specifically, as is shown in FIG. 16, a controller 9 can control an opening position of the door 22A to be at an arbitrary position between a position to close a return passage 20 and a position to close a second intake passage 23. As is shown in FIG. 16, the controller 9 can control an opening position of the door 25A to be at an arbitrary position between a position to close a first supply passage 24 and a position to close a second supply passage 26. Hence, the door 22A can open both of the return passage 20 and the second intake passage 23 while the door 25A can open both of the first supply passage 24 and the second supply passage 26. The door 25A is an example of a setting device that sets a target to which temperature-regulated air is supplied.

Regarding modes performed by the temperature regulation device 1C, descriptions will be given to two representative examples: an interior cooling and internal air mode and an interior cooling and external air mode. Firstly, descriptions will be given to operation states of the respective portions and flows of air in a cooling mode in which an interior cooling mode and an internal air circulation mode are performed.

In the interior cooling and internal air mode, the respective opening positions of the door 3, the door 4, the door 5, and the door 6 are controlled as is shown in FIG. 16 in the same manner as described in the fourth embodiment above with reference to FIG. 12. In the interior cooling and internal air mode of the fifth embodiment, the opening position of the door 22A and the opening position of the door 25A are different from those in the fourth embodiment above. Because the opening position of the door 22A is controlled to be between the position to close the return passage 20 and the position to close the second intake passage 23, both of the return passage 20 and the second intake passage 23 consequently communicate with an upstream passage 14. Also, because the opening position of the door 25A is controlled to be between the position to close the first supply passage 24 and the position to close the second supply passage 26, both of the first supply passage 24 and the second supply passage 26 consequently communicate with a downstream passage 15.

Owing to this configuration, passing air cooled in an evaporator 13 forms two circulating flows. One is a flow that continues to circulate in a circuit formed of air passages or the like in the second supply passage 26, the vehicle interior space, the second intake passage 23, and the evaporator 13. The other is a flow that continues to circulate in a circuit formed of air passages or the like in the first supply passage 24, an assembled battery 8, the return passage 20, and the evaporator 13. Hence, when the assembled battery 8 requires temperature regulation and a request of air conditioning is received from an air-conditioning ECU 40, the temperature regulation device 1C controls the opening positions of the door 22A and the door 25A as described above. Accordingly, the temperature regulation device 1C can perform both of the temperature regulation of the assembled battery 8 and the secondary air conditioning or the primary air conditioning of the vehicle interior space at the same time by the internal air circulation mode.

Description will now be given to operation states of the respective portions and flows of air in the cooling mode in which the interior cooling mode and an external air introduction mode are performed. An example shown in FIG. 17 is a case where a request of the external air introduction mode is received from the air-conditioning ECU 40.

In the interior cooling and external air mode, the respective opening positions of the door 3, the door 4, the door 6, and the door 22A are controlled as is shown in FIG. 17 in the same manner as described in the fourth embodiment above with reference to FIG. 13. In the interior cooling and external air mode of the fifth embodiment, the opening position of the door 5 and the opening position of the door 25A are different from those in the fourth embodiment above. Because the opening position of the door 5 is controlled so that a heat exchanging portion 13a of the evaporator 13 communicates with both of the upstream passage 14 and a first intake passage 16, both of the upstream passage 14 and the first intake passage 16 consequently communicate with the downstream passage 15. Also, because the opening position of the door 25A is controlled to be between the position to close the first supply passage 24 and the position to close the second supply passage 26, both of the first supply passage 24 and the second supply passage 26 consequently communicate with the downstream passage 15.

Owing to this configuration, external air let in through the first intake passage 16 is heated in the radiator 11, after which the external air forms two flows: a flow exhausted to the outside of the interior and a flow branching toward the assembled battery 8 and toward the vehicle interior space after cooled in the evaporator 13. Hence, the external air thus let in is cooled in the evaporator 13 in part and branches to a flow to the assembled battery 8 and a flow to the vehicle interior space and the rest absorbs heat in the radiator 11 and exhausts the heat to the outside of the vehicle interior.

Hence, when the assembled battery 8 requires temperature regulation and a request of air conditioning is received from the air-conditioning ECU 40, the temperature regulation device 1C controls the opening positions of the door 5, the door 22A, and the door 25A as described above. Accordingly, the temperature regulation device 1C can perform the temperature regulation of the assembled battery 8 and the secondary air conditioning or the primary air conditioning of the vehicle interior space at the same time by introduction external air.

An operational advantage obtained by the temperature regulation device 1C of the fifth embodiment will be described. According to the temperature regulation device 1C, multiple different temperature-regulation targets are set as the temperature-regulation target. The temperature regulation device 1C includes the setting device (the door 25A) that sets a sending destination of the temperature-regulated air to at least one of the multiple temperature regulation targets. In the fifth embodiment, the sending destination is set to two targets, the assembled battery 8 and the vehicle interior space, by way of example.

Owing to this configuration, a device capable of performing effective temperature regulation entirely even when more than one target among the multiple temperature-regulation targets requires cooling or heating at the present moment without sacrificing the temperature regulation request from any temperature-regulation target.

According to the temperature regulation device 1C, the multiple temperature-regulation targets include the vehicle interior space and an in-vehicle device (the assembled battery 8, an inverter, a charger, a motor, or the like). When the in-vehicle device requires temperature regulation and a request of temperature regulation of the vehicle interior space is received from the air-conditioning ECU 40 in the vehicle air-conditioning device, the setting device (the door 25A) sets the sending destination of the temperature-regulated air to both of the vehicle interior space and the in-vehicle device.

Owing to this configuration, the temperature regulation device 1C can be used as a secondary device for the air conditioning of the vehicle interior space and air-conditioning performance can be upgraded in response to a request from the air-conditioning device side. Hence, a device capable of not only satisfying a temperature regulation request from the in-vehicle device but also supporting air-conditioning performance for the vehicle interior space can be provided. For example, at the beginning of the travelling of the vehicle and after a short time from the boarding, the temperature regulation device 1C can exert the temperature regulation function for both of the in-vehicle device driven during the traveling and the vehicle interior space.

[Other Embodiments]

While the above has described preferred embodiments of the present disclosure, it should be appreciated that the present disclosure is not limited to the embodiments described above and can be modified in various manners within the scope of the present disclosure. Structures of the embodiments above are mere examples and the scope of the present disclosure is not limited to the descriptions above.

As the temperature-regulation targets to which the present disclosure is applicable, besides the vehicle interior space 30 and the assembled battery 8, electric devices, such as an inverter, a motor, and an in-vehicle charger, an inter-cooler that regulates a temperature of supercharged air, an engine, and a heat exchanger that regulates a temperature of oil, such as an ATF, can be adopted as well.

In the embodiments above, the temperature of the electric cells is detected by the battery temperature sensor 21. However, a temperature of an enclosure storing the battery, a temperature of another member in the vicinity of the battery, an atmospheric temperature of the battery, or the like may be detected instead of the temperature of the battery as the temperature-regulation target, and used as an index on the basis of which to determine a temperature state of the battery.

The low-performance cooling mode described in the first embodiment and the second embodiment above can be also performed in the fourth embodiment and the fifth embodiment above.

In the fifth embodiment, the temperature regulation device 1C sets the sending destination of the temperature-regulated air to two targets among the multiple temperature-regulation targets. The temperature regulation device of the present disclosure includes a type that sets the sending destination of the temperature-regulated air to three or more temperature-regulation targets.

In the embodiments above, the blower 2 and the electric fan 7 are formed in such a manner that the rotation number thereof can be controlled by the controller 9. It should be appreciated, however, that the blower 2 and the electric fan 7 may be devices that can be only operated and stopped and have the rotation number that cannot be controlled.

In the embodiments above, the doors 3 through 6 are examples of the path switching device having a plate-shaped door main body. It should be appreciated, however, that the doors 3 through 6 are not limited to this configuration. For example, a slide open door or a door having a film-like door main body may also be adopted as the doors 3 through 6.

In the embodiments above, the electric cells forming the assembled battery 8 can be shaped like a flat rectangular prism or can be of a cylindrical or any reasonable shape, that is, the shape is not particularly limited.

What is claimed is:

1. A temperature regulation device, comprising:
   at least one temperature-regulation target to which air regulated in temperature is sent, the temperature-regulation target being provided to a vehicle;
   an air sending device sending the temperature-regulated air to the temperature-regulation target;
   a path switching device changing an air path, through which the temperature-regulated air flows, according to an operation mode;
   a heating heat exchanger heating air to be sent to the temperature-regulation target in a heating mode to heat the temperature-regulation target by a heat releasing action of a refrigerant flowing in a refrigeration cycle;
   a cooling heat exchanger cooling air to be sent to the temperature-regulation target in a cooling mode to cool the temperature-regulation target by a heat absorbing action of the refrigerant flowing in the refrigeration cycle;
   a compressor discharging the refrigerant to the heating heat exchanger in the refrigeration cycle;
   a temperature detector detecting a temperature of the temperature-regulation target; and
   a controller controlling the path switching device, the air sending device, and the compressor when each of the heating mode and the cooling mode is performed,
   wherein the cooling heat exchanger is located at a lower position than the heating heat exchanger, and
   the controller performs:
      the cooling mode at high performance by controlling the path switching device and the air sending device while driving the compressor when the temperature of the temperature-regulation target detected by the temperature detector exceeds a first predetermined temperature;
      the heating mode by controlling the path switching device and the air sending device while driving the compressor when the temperature of the temperature-regulation target detected by the temperature detector is below a second predetermined temperature that is lower than the first predetermined temperature; and
      the cooling mode at low performance by controlling the path switching device and the air sending device so as to send air from which heat is absorbed in the cooling heat exchanger to the temperature-regulation target while controlling the compressor not to be driven but to be in a stopped state when the temperature of the temperature-regulation target detected by the temperature detector falls in a predetermined temperature range from the second predetermined temperature to the first predetermined temperature, both inclusive.

2. The temperature regulation device according to claim 1, comprising the refrigeration cycle that includes: a bypass passage that connects the cooling heat exchanger and the heating heat exchanger with bypassing the compressor; and a valve device that enables or disables flowing of the refrigerant in the bypass passage.

3. The temperature regulation device according to claim 1, wherein the heating heat exchanger has an outlet port that communicates with the cooling heat exchanger and is located in a lower part of the heating heat exchanger.

4. The temperature regulation device according to claim 1, wherein:
   the temperature-regulation target includes multiple temperature-regulation targets; and
   the temperature regulation device further comprises a setting device setting at least one of the multiple temperature-regulation targets to a sending destination of the temperature-regulated air.

5. The temperature regulation device according to claim 4, wherein:
   the multiple temperature-regulation targets include a vehicle interior space and an in-vehicle device; and
   when the in-vehicle device does not require temperature regulation and a request of temperature regulation of the vehicle interior space is received from a vehicle air-conditioning device mounted on the vehicle, the setting device sets the vehicle interior space to the sending destination of the temperature-regulated air.

6. The temperature regulation device according to claim 4, wherein:
   the multiple temperature-regulation targets include a vehicle interior space and an in-vehicle device; and
   when the in-vehicle device requires temperature regulation and a request of temperature regulation of the vehicle interior space is received from a vehicle air-conditioning device mounted on the vehicle, the setting device sets both the vehicle interior space and the in-vehicle device to the sending destinations of the temperature-regulated air.

7. The temperature regulation device according to claim 1, wherein the temperature-regulation target is a secondary battery that stores electric power to run the vehicle.

* * * * *